United States Patent
Schlottmann

(10) Patent No.: US 8,605,114 B2
(45) Date of Patent: Dec. 10, 2013

(54) GAMING SYSTEM HAVING REDUCED APPEARANCE OF PARALLAX ARTIFACTS ON DISPLAY DEVICES INCLUDING MULTIPLE DISPLAY SCREENS

(75) Inventor: Gregory A. Schlottmann, Sparks, NV (US)

(73) Assignee: IGT, Las Vegas, NV (US)

( * ) Notice: Subject to any disclaimer, the term of this patent is extended or adjusted under 35 U.S.C. 154(b) by 70 days.

(21) Appl. No.: 13/399,565

(22) Filed: Feb. 17, 2012

(65) Prior Publication Data

US 2013/0217486 A1  Aug. 22, 2013

(51) Int. Cl.
G09G 5/00 (2006.01)
H04N 13/02 (2006.01)
A63F 13/00 (2006.01)

(52) U.S. Cl.
USPC .......... 345/629; 345/6; 345/630; 348/46; 463/20

(58) Field of Classification Search
USPC ............ 345/6, 629–631; 348/46; 349/73; 359/630; 463/20, 32
See application file for complete search history.

(56) References Cited

U.S. PATENT DOCUMENTS

| | | |
|---|---|---|
| 1,978,395 A | 4/1934 | Groetchen |
| 2,545,644 A | 3/1951 | Benton et al. |
| 3,420,525 A | 1/1969 | Waders |
| 3,642,287 A | 2/1972 | Lally et al. |
| 3,708,219 A | 1/1973 | Forlini et al. |
| 3,735,987 A | 5/1973 | Ohki |
| 3,975,022 A | 8/1976 | Figueroa |
| 4,326,351 A | 4/1982 | Heywood et al. |
| 4,333,715 A | 6/1982 | Brooks |
| 4,410,178 A | 10/1983 | Partridge |
| 4,448,419 A | 5/1984 | Telnaes |
| 4,517,558 A | 5/1985 | Davids |
| 4,574,391 A | 3/1986 | Morishima |
| 4,607,844 A | 8/1986 | Fullerton |
| 4,621,814 A | 11/1986 | Stepan et al. |
| 4,659,182 A | 4/1987 | Aizawa |

(Continued)

FOREIGN PATENT DOCUMENTS

| | | |
|---|---|---|
| CA | 2 265 283 | 10/1926 |
| DE | 3105266 | 9/1982 |

(Continued)

OTHER PUBLICATIONS

"Is it real, or is it REELdepth?" Advertisement, Copyright 2008 to IGT (1 page).

(Continued)

Primary Examiner — Dmitry Suhol
Assistant Examiner — Jason Yen
(74) Attorney, Agent, or Firm — Neal, Gerber & Eisenberg LLP

(57) ABSTRACT

Various embodiments of the present disclosure provide gaming systems having reduced appearance of parallax artifacts on display devices including multiple display screens. In one embodiment, the gaming system determines a location on a first display screen of a display device at which to display a portion of a first image and subsequently determines, based on that determined location and one or more other variables, a location on a second display screen of the display device at which to display a portion of a second image such that the appearance of parallax artifacts associated with the first image and the second image is reduced or eliminated.

30 Claims, 19 Drawing Sheets

(56) References Cited

U.S. PATENT DOCUMENTS

| | | |
|---|---|---|
| 4,695,053 A | 9/1987 | Vazquez, Jr. et al. |
| 4,718,672 A | 1/1988 | Okada |
| 4,732,386 A | 3/1988 | Rayfiel |
| 4,745,197 A | 5/1988 | Eisenbarth et al. |
| 4,911,449 A | 3/1990 | Dickinson et al. |
| 4,912,548 A | 3/1990 | Shanker et al. |
| 4,978,129 A | 12/1990 | Komeda et al. |
| 5,058,893 A | 10/1991 | Bertram et al. |
| 5,086,354 A | 2/1992 | Bass et al. |
| 5,113,272 A | 5/1992 | Reamey |
| 5,132,839 A | 7/1992 | Travis |
| 5,152,529 A | 10/1992 | Okada |
| 5,319,491 A | 6/1994 | Selbrede |
| 5,342,047 A | 8/1994 | Heidel et al. |
| 5,364,100 A | 11/1994 | Ludlow et al. |
| 5,375,830 A | 12/1994 | Takemoto et al. |
| 5,376,587 A | 12/1994 | Buchmann et al. |
| 5,393,057 A | 2/1995 | Marnell, II |
| 5,393,061 A | 2/1995 | Manship et al. |
| 5,395,111 A | 3/1995 | Inoue |
| 5,449,173 A | 9/1995 | Thomas et al. |
| 5,467,893 A | 11/1995 | Landis, II et al. |
| 5,539,547 A | 7/1996 | Ishii et al. |
| 5,560,603 A | 10/1996 | Seelig et al. |
| 5,580,055 A | 12/1996 | Hagiwara |
| 5,584,763 A | 12/1996 | Kelly et al. |
| 5,584,764 A | 12/1996 | Inoue |
| 5,585,821 A | 12/1996 | Ishikura et al. |
| 5,589,980 A | 12/1996 | Bass et al. |
| 5,609,524 A | 3/1997 | Inoue |
| 5,647,798 A | 7/1997 | Falciglia |
| 5,655,965 A | 8/1997 | Takemoto et al. |
| 5,664,998 A | 9/1997 | Seelig et al. |
| 5,712,732 A * | 1/1998 | Street ............................ 359/630 |
| 5,722,891 A | 3/1998 | Inoue |
| 5,725,428 A | 3/1998 | Achmüller |
| 5,745,197 A | 4/1998 | Leung et al. |
| 5,752,881 A | 5/1998 | Inoue |
| 5,762,552 A | 6/1998 | Vuong et al. |
| 5,764,317 A | 6/1998 | Sadovnik et al. |
| 5,785,315 A | 7/1998 | Eiteneer et al. |
| 5,788,573 A | 8/1998 | Baerlocher et al. |
| 5,823,872 A | 10/1998 | Prather et al. |
| 5,823,874 A | 10/1998 | Adams et al. |
| D400,597 S | 11/1998 | Hedrick et al. |
| 5,833,537 A | 11/1998 | Barrie |
| D402,702 S | 12/1998 | Seelig et al. |
| 5,848,932 A | 12/1998 | Adams |
| 5,851,148 A | 12/1998 | Brune et al. |
| 5,863,249 A | 1/1999 | Inoue |
| D406,865 S | 3/1999 | Heidel |
| 5,882,261 A | 3/1999 | Adams |
| 5,908,381 A | 6/1999 | Aznoian et al. |
| 5,910,046 A | 6/1999 | Wada et al. |
| 5,911,418 A | 6/1999 | Adams |
| 5,923,307 A | 7/1999 | Hogle, IV |
| 5,927,714 A | 7/1999 | Kaplan |
| 5,947,820 A | 9/1999 | Morro et al. |
| 5,951,397 A | 9/1999 | Dickinson |
| 5,956,180 A | 9/1999 | Bass et al. |
| 5,967,893 A | 10/1999 | Lawrence et al. |
| 5,976,015 A | 11/1999 | Seelig et al. |
| 5,984,782 A | 11/1999 | Inoue |
| 5,997,401 A | 12/1999 | Crawford |
| 6,001,016 A | 12/1999 | Walker et al. |
| 6,004,207 A | 12/1999 | Wilson, Jr. et al. |
| 6,015,346 A | 1/2000 | Bennett |
| 6,027,115 A | 2/2000 | Griswold et al. |
| 6,050,895 A | 4/2000 | Luciano, Jr. et al. |
| 6,054,969 A | 4/2000 | Haisma |
| 6,056,642 A | 5/2000 | Bennett |
| 6,057,814 A | 5/2000 | Kalt |
| 6,059,289 A | 5/2000 | Vancura |
| 6,059,658 A | 5/2000 | Mangano et al. |
| 6,068,552 A | 5/2000 | Walker et al. |
| 6,086,066 A | 7/2000 | Takeuchi et al. |
| 6,089,977 A | 7/2000 | Bennett |
| 6,089,978 A | 7/2000 | Adams |
| 6,093,102 A | 7/2000 | Bennett |
| 6,105,962 A | 8/2000 | Malavazos et al. |
| 6,113,098 A | 9/2000 | Adams |
| 6,135,884 A | 10/2000 | Hedrick et al. |
| 6,142,873 A | 11/2000 | Weiss et al. |
| 6,142,874 A | 11/2000 | Kodachi et al. |
| 6,159,095 A | 12/2000 | Frohm et al. |
| 6,159,098 A | 12/2000 | Slomiany et al. |
| 6,162,121 A | 12/2000 | Morro et al. |
| 6,164,645 A | 12/2000 | Weiss |
| 6,168,520 B1 | 1/2001 | Baerlocher et al. |
| 6,173,955 B1 | 1/2001 | Perrie et al. |
| 6,174,234 B1 | 1/2001 | Seibert et al. |
| 6,174,235 B1 | 1/2001 | Walker et al. |
| 6,203,429 B1 | 3/2001 | Demar et al. |
| D441,031 S | 4/2001 | Seelig et al. |
| 6,213,875 B1 | 4/2001 | Suzuki |
| 6,213,876 B1 | 4/2001 | Moore, Jr. |
| 6,220,593 B1 | 4/2001 | Pierce et al. |
| 6,224,483 B1 | 5/2001 | Mayeroff |
| 6,227,970 B1 | 5/2001 | Shimizu et al. |
| 6,227,971 B1 | 5/2001 | Weiss |
| D443,313 S | 6/2001 | Brettschneider |
| 6,244,596 B1 | 6/2001 | Kondratjuk |
| 6,251,013 B1 | 6/2001 | Bennett |
| 6,251,014 B1 | 6/2001 | Stockdale et al. |
| 6,252,707 B1 | 6/2001 | Kleinberger et al. |
| 6,254,481 B1 | 7/2001 | Jaffe |
| 6,261,177 B1 | 7/2001 | Bennett |
| 6,267,669 B1 | 7/2001 | Luciano, Jr. et al. |
| 6,270,411 B1 | 8/2001 | Gura et al. |
| 6,270,412 B1 | 8/2001 | Crawford |
| 6,297,785 B1 | 10/2001 | Sommer et al. |
| 6,302,790 B1 | 10/2001 | Brossard |
| 6,305,686 B1 | 10/2001 | Perrie et al. |
| 6,312,334 B1 | 11/2001 | Yoseloff |
| 6,315,663 B1 | 11/2001 | Sakamoto |
| 6,315,666 B1 | 11/2001 | Mastera et al. |
| 6,322,445 B1 | 11/2001 | Miller |
| 6,334,814 B1 | 1/2002 | Adams |
| 6,336,863 B1 | 1/2002 | Baerlocher et al. |
| 6,337,513 B1 | 1/2002 | Clevenger et al. |
| 6,340,158 B2 | 1/2002 | Pierce et al. |
| 6,347,996 B1 | 2/2002 | Gilmore et al. |
| 6,368,216 B1 | 4/2002 | Hedrick et al. |
| 6,379,244 B1 | 4/2002 | Sagawa et al. |
| 6,386,974 B1 | 5/2002 | Adams |
| 6,398,220 B1 | 6/2002 | Inoue |
| 6,416,827 B1 | 7/2002 | Chakrapani et al. |
| 6,419,579 B1 | 7/2002 | Bennett et al. |
| 6,444,496 B1 | 9/2002 | Edwards et al. |
| 6,445,185 B1 | 9/2002 | Damadian et al. |
| 6,461,241 B1 | 10/2002 | Webb et al. |
| D465,531 S | 11/2002 | Luciano, Jr. et al. |
| 6,481,713 B2 | 11/2002 | Perrie et al. |
| 6,491,583 B1 | 12/2002 | Gauselmann |
| 6,503,147 B1 | 1/2003 | Stockdale et al. |
| 6,511,375 B1 | 1/2003 | Kaminkow |
| 6,512,559 B1 | 1/2003 | Hashimoto et al. |
| 6,514,141 B1 | 2/2003 | Kaminkow et al. |
| 6,517,432 B1 | 2/2003 | Jaffe |
| 6,517,433 B2 | 2/2003 | Loose et al. |
| 6,517,437 B1 | 2/2003 | Wells et al. |
| 6,520,856 B1 | 2/2003 | Walker et al. |
| 6,533,273 B2 | 3/2003 | Cole et al. |
| 6,533,660 B2 | 3/2003 | Seelig et al. |
| 6,537,152 B2 | 3/2003 | Seelig et al. |
| 6,547,664 B2 | 4/2003 | Saunders |
| 6,575,541 B1 | 6/2003 | Hedrick et al. |
| 6,582,307 B2 | 6/2003 | Webb |
| 6,585,591 B1 | 7/2003 | Baerlocher et al. |
| 6,589,114 B2 | 7/2003 | Rose |
| 6,605,000 B2 | 8/2003 | Adams |
| 6,608,296 B1 * | 8/2003 | Toyoda et al. ............. 250/208.1 |
| 6,609,972 B2 | 8/2003 | Seelig et al. |
| 6,612,574 B1 | 9/2003 | Cole et al. |

(56) References Cited

U.S. PATENT DOCUMENTS

| | | |
|---|---|---|
| 6,612,575 B1 | 9/2003 | Cole et al. |
| 6,612,927 B1 | 9/2003 | Slomiany et al. |
| D480,961 S | 10/2003 | Deadman |
| 6,638,167 B1 | 10/2003 | Sawyer et al. |
| 6,644,664 B2 | 11/2003 | Muir et al. |
| 6,646,695 B1 | 11/2003 | Gauselmann |
| 6,652,378 B2 | 11/2003 | Cannon et al. |
| 6,659,864 B2 | 12/2003 | McGahn et al. |
| 6,661,425 B1 | 12/2003 | Hiroaki |
| 6,663,488 B1 | 12/2003 | Adams |
| 6,663,489 B2 | 12/2003 | Baerlocher |
| 6,695,696 B1 | 2/2004 | Kaminkow |
| 6,695,703 B1 | 2/2004 | McGahn |
| 6,702,675 B2 | 3/2004 | Poole et al. |
| 6,712,694 B1 | 3/2004 | Nordman |
| 6,715,756 B2 | 4/2004 | Inoue |
| 6,717,728 B2 | 4/2004 | Putilin |
| 6,722,979 B2 | 4/2004 | Gilmore et al. |
| 6,726,204 B2 | 4/2004 | Inoue |
| D496,968 S | 10/2004 | Baerlocher |
| 6,802,777 B2 | 10/2004 | Seelig et al. |
| 6,817,945 B2 | 11/2004 | Seelig et al. |
| 6,817,946 B2 | 11/2004 | Motegi et al. |
| 6,827,646 B2 | 12/2004 | Adams |
| D503,951 S | 4/2005 | Karstens |
| 6,887,157 B2 | 5/2005 | LeMay et al. |
| 6,890,254 B2 | 5/2005 | Kaminkow |
| 6,890,259 B2 | 5/2005 | Breckner et al. |
| 6,906,762 B1 * | 6/2005 | Witehira et al. ............... 349/73 |
| 6,908,381 B2 | 6/2005 | Ellis |
| 6,937,298 B2 | 8/2005 | Okada |
| 6,964,609 B2 | 11/2005 | Haag et al. |
| 6,981,635 B1 | 1/2006 | Hughs-Baird et al. |
| 7,011,581 B2 | 3/2006 | Cole et al. |
| 7,040,987 B2 | 5/2006 | Walker et al. |
| 7,056,215 B1 | 6/2006 | Olive |
| 7,066,814 B2 | 6/2006 | Glavich et al. |
| 7,095,180 B2 | 8/2006 | Emslie et al. |
| 7,097,560 B2 | 8/2006 | Okada |
| 7,108,603 B2 | 9/2006 | Olive |
| 7,115,033 B1 | 10/2006 | Timperley |
| 7,128,647 B2 | 10/2006 | Muir |
| 7,140,963 B2 | 11/2006 | Kojima |
| 7,144,321 B2 | 12/2006 | Mayeroff |
| 7,159,865 B2 | 1/2007 | Okada |
| 7,160,187 B2 | 1/2007 | Loose et al. |
| 7,166,029 B2 | 1/2007 | Enzminger |
| 7,169,048 B2 | 1/2007 | Nozaki et al. |
| 7,179,169 B2 | 2/2007 | Beaulieu et al. |
| 7,198,570 B2 | 4/2007 | Rodgers et al. |
| 7,204,753 B2 | 4/2007 | Ozaki et al. |
| 7,219,893 B2 | 5/2007 | Tanimura et al. |
| 7,220,181 B2 | 5/2007 | Okada |
| 7,226,358 B2 | 6/2007 | Miller et al. |
| 7,234,697 B2 | 6/2007 | Okada |
| 7,252,288 B2 | 8/2007 | Seelig et al. |
| 7,252,591 B2 | 8/2007 | Van Asdale |
| 7,255,643 B2 | 8/2007 | Ozaki et al. |
| 7,274,413 B1 | 9/2007 | Sullivan et al. |
| 7,281,980 B2 | 10/2007 | Okada et al. |
| 7,285,049 B1 | 10/2007 | Luciano, Jr. et al. |
| 7,306,520 B2 | 12/2007 | Kaminkow et al. |
| 7,309,284 B2 | 12/2007 | Griswold et al. |
| 7,311,598 B2 | 12/2007 | Kaminkow et al. |
| 7,311,604 B2 | 12/2007 | Kaminkow et al. |
| 7,322,884 B2 | 1/2008 | Emori et al. |
| 7,324,094 B2 | 1/2008 | Moilanen et al. |
| 7,329,181 B2 | 2/2008 | Hoshino et al. |
| 7,352,424 B2 | 4/2008 | Searle |
| 7,354,342 B2 | 4/2008 | Paulsen et al. |
| 7,355,660 B2 | 4/2008 | Ikeda |
| 7,390,259 B2 | 6/2008 | Okada |
| 7,399,226 B2 | 7/2008 | Mishra |
| 7,404,766 B2 | 7/2008 | Adachi et al. |
| 7,439,683 B2 | 10/2008 | Emslie et al. |
| 7,458,890 B2 | 12/2008 | Loose et al. |
| 7,465,228 B2 | 12/2008 | Okada |
| 7,473,173 B2 | 1/2009 | Peterson et al. |
| 7,479,061 B2 | 1/2009 | Okada |
| 7,479,066 B2 | 1/2009 | Emori |
| 7,485,039 B2 | 2/2009 | Okada |
| 7,505,049 B2 | 3/2009 | Engel |
| 7,510,475 B2 | 3/2009 | Loose et al. |
| 7,510,476 B2 | 3/2009 | Kobayashi |
| 7,520,812 B2 | 4/2009 | Okada |
| 7,558,057 B1 | 7/2009 | Naksen et al. |
| 7,559,837 B1 | 7/2009 | Yoseloff et al. |
| 7,585,220 B2 | 9/2009 | Loose et al. |
| 7,594,852 B2 | 9/2009 | Rasmussen |
| 7,619,585 B2 | 11/2009 | Bell et al. |
| 7,624,339 B1 | 11/2009 | Engel et al. |
| 7,626,594 B1 | 12/2009 | Witehira et al. |
| 7,677,572 B2 | 3/2010 | Ozaki et al. |
| 7,695,364 B2 | 4/2010 | Okada |
| 7,710,391 B2 | 5/2010 | Bell et al. |
| 7,724,208 B1 | 5/2010 | Engel et al. |
| 7,730,413 B1 | 6/2010 | Engel et al. |
| 7,742,124 B2 | 6/2010 | Bell |
| 7,742,239 B2 | 6/2010 | Bell et al. |
| 7,841,944 B2 | 11/2010 | Wells |
| 7,892,094 B2 | 2/2011 | Tanimura et al. |
| 7,972,206 B2 | 7/2011 | Okada |
| 8,007,360 B2 | 8/2011 | Kishi |
| 8,016,669 B2 | 9/2011 | Okada |
| 8,096,867 B2 | 1/2012 | Okada |
| 2001/0013681 A1 | 8/2001 | Bruzzese et al. |
| 2001/0016513 A1 | 8/2001 | Muir et al. |
| 2001/0024971 A1 | 9/2001 | Brossard |
| 2001/0031658 A1 | 10/2001 | Ozaki et al. |
| 2001/0054794 A1 | 12/2001 | Cole et al. |
| 2002/0022518 A1 | 2/2002 | Okuda et al. |
| 2002/0036648 A1 * | 3/2002 | Putilin ............... 345/629 |
| 2002/0045472 A1 | 4/2002 | Adams |
| 2002/0086725 A1 | 7/2002 | Fasbender et al. |
| 2002/0094862 A1 | 7/2002 | Inoue |
| 2002/0119035 A1 | 8/2002 | Hamilton |
| 2002/0142829 A1 | 10/2002 | Inoue |
| 2002/0167637 A1 | 11/2002 | Burke et al. |
| 2002/0173354 A1 | 11/2002 | Winans et al. |
| 2002/0175466 A1 | 11/2002 | Loose et al. |
| 2002/0183105 A1 | 12/2002 | Cannon et al. |
| 2003/0026171 A1 | 2/2003 | Brewer et al. |
| 2003/0027624 A1 | 2/2003 | Gilmore et al. |
| 2003/0032478 A1 | 2/2003 | Takahama et al. |
| 2003/0032479 A1 | 2/2003 | LeMay et al. |
| 2003/0060271 A1 | 3/2003 | Gilmore et al. |
| 2003/0064781 A1 | 4/2003 | Muir |
| 2003/0069063 A1 | 4/2003 | Bilyeu et al. |
| 2003/0087690 A1 | 5/2003 | Loose et al. |
| 2003/0128427 A1 | 7/2003 | Kalmanash et al. |
| 2003/0130028 A1 | 7/2003 | Aida et al. |
| 2003/0157980 A1 | 8/2003 | Loose et al. |
| 2003/0176214 A1 | 9/2003 | Burak et al. |
| 2003/0199295 A1 | 10/2003 | Vancura |
| 2003/0220134 A1 | 11/2003 | Walker et al. |
| 2003/0232643 A1 | 12/2003 | Inoue |
| 2003/0234489 A1 | 12/2003 | Okada |
| 2003/0236114 A1 | 12/2003 | Griswold et al. |
| 2003/0236118 A1 | 12/2003 | Okada |
| 2004/0000754 A1 | 1/2004 | Inoue |
| 2004/0009803 A1 | 1/2004 | Bennett et al. |
| 2004/0012145 A1 | 1/2004 | Inoue |
| 2004/0014516 A1 | 1/2004 | Inoue |
| 2004/0014517 A1 | 1/2004 | Inoue |
| 2004/0017041 A1 | 1/2004 | Inoue |
| 2004/0018866 A1 | 1/2004 | Inoue |
| 2004/0023714 A1 | 2/2004 | Asdale |
| 2004/0026854 A1 | 2/2004 | Inoue |
| 2004/0029636 A1 * | 2/2004 | Wells ............... 463/32 |
| 2004/0036218 A1 | 2/2004 | Inoue |
| 2004/0038726 A1 | 2/2004 | Inoue |
| 2004/0041340 A1 | 3/2004 | Inoue |
| 2004/0053660 A1 | 3/2004 | Webb et al. |
| 2004/0053665 A1 | 3/2004 | Baerlocher |

(56) References Cited

U.S. PATENT DOCUMENTS

| | | |
|---|---|---|
| 2004/0063490 A1 | 4/2004 | Okada |
| 2004/0066475 A1 | 4/2004 | Searle |
| 2004/0077401 A1 | 4/2004 | Schlottmann |
| 2004/0082373 A1 | 4/2004 | Cole et al. |
| 2004/0102244 A1 | 5/2004 | Kryuchkov et al. |
| 2004/0102245 A1 | 5/2004 | Escalera et al. |
| 2004/0116178 A1 | 6/2004 | Okada |
| 2004/0142748 A1 | 7/2004 | Loose et al. |
| 2004/0147303 A1 | 7/2004 | Imura et al. |
| 2004/0150162 A1 | 8/2004 | Okada |
| 2004/0162146 A1 | 8/2004 | Ooto |
| 2004/0166925 A1 | 8/2004 | Emori et al. |
| 2004/0171423 A1 | 9/2004 | Silva et al. |
| 2004/0183251 A1 | 9/2004 | Inoue |
| 2004/0183972 A1 | 9/2004 | Bell |
| 2004/0192430 A1 | 9/2004 | Burak et al. |
| 2004/0192441 A1 | 9/2004 | Nonaka |
| 2004/0198485 A1 | 10/2004 | Loose et al. |
| 2004/0207154 A1 | 10/2004 | Okada |
| 2004/0209447 A1 | 10/2004 | Gosain et al. |
| 2004/0209666 A1 | 10/2004 | Tashiro et al. |
| 2004/0209667 A1 | 10/2004 | Emori et al. |
| 2004/0209668 A1 | 10/2004 | Okada |
| 2004/0209670 A1 | 10/2004 | Adachi et al. |
| 2004/0209671 A1 | 10/2004 | Okada |
| 2004/0209672 A1 | 10/2004 | Okada |
| 2004/0209678 A1 | 10/2004 | Okada |
| 2004/0209679 A1 | 10/2004 | Nonaka |
| 2004/0209683 A1 | 10/2004 | Okada |
| 2004/0214630 A1 | 10/2004 | Mayeroff |
| 2004/0214635 A1 | 10/2004 | Okada |
| 2004/0214636 A1 | 10/2004 | Nonaka |
| 2004/0214637 A1 | 10/2004 | Nonaka |
| 2004/0219967 A1 | 11/2004 | Giobbi et al. |
| 2004/0224747 A1 | 11/2004 | Okada |
| 2004/0224758 A1 | 11/2004 | Okada et al. |
| 2004/0229686 A1 | 11/2004 | Tanimura et al. |
| 2004/0233663 A1 | 11/2004 | Emslie et al. |
| 2004/0239582 A1 | 12/2004 | Seymour |
| 2004/0242323 A1 | 12/2004 | Okada |
| 2004/0256536 A1 | 12/2004 | Su et al. |
| 2004/0266515 A1 | 12/2004 | Gauselmann |
| 2004/0266536 A1 | 12/2004 | Mattice et al. |
| 2005/0012724 A1 | 1/2005 | Kent |
| 2005/0020348 A1 | 1/2005 | Thomas et al. |
| 2005/0020349 A1 | 1/2005 | Tachikawa |
| 2005/0026671 A1 | 2/2005 | Baerlocher |
| 2005/0026673 A1 | 2/2005 | Paulsen et al. |
| 2005/0032571 A1 | 2/2005 | Asonuma |
| 2005/0037843 A1 | 2/2005 | Wells et al. |
| 2005/0049032 A1 | 3/2005 | Kobayashi |
| 2005/0049046 A1 | 3/2005 | Kobayashi |
| 2005/0054424 A1 | 3/2005 | Rothkranz et al. |
| 2005/0059486 A1 | 3/2005 | Kaminkow |
| 2005/0062410 A1 | 3/2005 | Bell et al. |
| 2005/0063055 A1 | 3/2005 | Engel |
| 2005/0075159 A1 | 4/2005 | Kaminkow et al. |
| 2005/0079913 A1 | 4/2005 | Inamura |
| 2005/0085292 A1 | 4/2005 | Inamura |
| 2005/0164786 A1 | 7/2005 | Connelly |
| 2005/0176493 A1 | 8/2005 | Nozaki et al. |
| 2005/0187003 A1 | 8/2005 | Adachi et al. |
| 2005/0192083 A1 | 9/2005 | Iwamoto |
| 2005/0192084 A1 | 9/2005 | Iwamoto |
| 2005/0192085 A1 | 9/2005 | Iwamoto |
| 2005/0192090 A1 | 9/2005 | Muir et al. |
| 2005/0206582 A1* | 9/2005 | Bell et al. ................... 345/6 |
| 2005/0208994 A1 | 9/2005 | Berman |
| 2005/0233799 A1 | 10/2005 | LeMay et al. |
| 2005/0239539 A1 | 10/2005 | Inamura |
| 2005/0245302 A1 | 11/2005 | Bathiche et al. |
| 2005/0253775 A1 | 11/2005 | Stewart |
| 2005/0255908 A1 | 11/2005 | Wells |
| 2005/0266912 A1 | 12/2005 | Sekiguchi |
| 2005/0272500 A1 | 12/2005 | Tanimura et al. |
| 2005/0282616 A1 | 12/2005 | Tanimura et al. |
| 2005/0282617 A1 | 12/2005 | Sekiguchi et al. |
| 2005/0285337 A1 | 12/2005 | Durham et al. |
| 2006/0025199 A1 | 2/2006 | Harkins et al. |
| 2006/0040721 A1 | 2/2006 | Cuddy et al. |
| 2006/0046822 A1 | 3/2006 | Kaminkow et al. |
| 2006/0058100 A1 | 3/2006 | Pacey et al. |
| 2006/0063580 A1 | 3/2006 | Nguyen et al. |
| 2006/0063584 A1 | 3/2006 | Brill et al. |
| 2006/0068875 A1 | 3/2006 | Cregan et al. |
| 2006/0073872 A1 | 4/2006 | B-Jensen et al. |
| 2006/0073873 A1 | 4/2006 | Rodgers et al. |
| 2006/0073881 A1 | 4/2006 | Pryzby et al. |
| 2006/0089192 A1 | 4/2006 | Okada |
| 2006/0100014 A1 | 5/2006 | Griswold et al. |
| 2006/0103951 A1 | 5/2006 | Bell et al. |
| 2006/0111179 A1 | 5/2006 | Inamura |
| 2006/0125745 A1 | 6/2006 | Evanicky |
| 2006/0125746 A1 | 6/2006 | Sallese et al. |
| 2006/0166727 A1 | 7/2006 | Burak |
| 2006/0191177 A1 | 8/2006 | Engel |
| 2006/0221642 A1* | 10/2006 | Daiku .......................... 362/626 |
| 2006/0223627 A1 | 10/2006 | Nozaki et al. |
| 2006/0237905 A1 | 10/2006 | Nicely et al. |
| 2006/0281532 A1 | 12/2006 | Yoshizawa |
| 2006/0284574 A1 | 12/2006 | Emslie et al. |
| 2006/0290594 A1 | 12/2006 | Engel et al. |
| 2007/0004510 A1 | 1/2007 | Underdahl et al. |
| 2007/0004513 A1 | 1/2007 | Wells |
| 2007/0010315 A1 | 1/2007 | Hein |
| 2007/0021180 A1 | 1/2007 | Osawa |
| 2007/0026932 A1 | 2/2007 | Sato |
| 2007/0060249 A1 | 3/2007 | Gomez et al. |
| 2007/0060296 A1 | 3/2007 | Yoshizawa |
| 2007/0066383 A1 | 3/2007 | Mori et al. |
| 2007/0066389 A1 | 3/2007 | Kojima |
| 2007/0072665 A1 | 3/2007 | Muir |
| 2007/0077986 A1 | 4/2007 | Loose et al. |
| 2007/0105610 A1 | 5/2007 | Anderson |
| 2007/0120320 A1 | 5/2007 | Miltenberger et al. |
| 2007/0123330 A1 | 5/2007 | Hishinuma et al. |
| 2007/0123332 A1 | 5/2007 | Hishinuma et al. |
| 2007/0123348 A1 | 5/2007 | Nozaki |
| 2007/0123349 A1 | 5/2007 | Hishinuma et al. |
| 2007/0135203 A1 | 6/2007 | Nicely |
| 2007/0135204 A1 | 6/2007 | Nicely |
| 2007/0158904 A1 | 7/2007 | Okada |
| 2007/0184893 A1 | 8/2007 | Fujimoto |
| 2007/0202948 A1 | 8/2007 | Muir et al. |
| 2007/0206713 A1 | 9/2007 | Yamaguchi |
| 2007/0207851 A1 | 9/2007 | Yoshizawa |
| 2007/0218982 A1 | 9/2007 | Baerlocher |
| 2007/0228651 A1 | 10/2007 | Loose et al. |
| 2007/0252804 A1 | 11/2007 | Engel et al. |
| 2007/0257891 A1 | 11/2007 | Esenther et al. |
| 2008/0004104 A1 | 1/2008 | Durham et al. |
| 2008/0007486 A1 | 1/2008 | Fujinawa et al. |
| 2008/0020820 A1 | 1/2008 | Iwamoto |
| 2008/0020839 A1 | 1/2008 | Wells et al. |
| 2008/0020840 A1 | 1/2008 | Wells et al. |
| 2008/0020841 A1 | 1/2008 | Wells et al. |
| 2008/0064497 A1 | 3/2008 | Griswold et al. |
| 2008/0096655 A1 | 4/2008 | Rasmussen et al. |
| 2008/0113745 A1 | 5/2008 | Williams et al. |
| 2008/0113746 A1* | 5/2008 | Williams et al. ................. 463/20 |
| 2008/0113747 A1 | 5/2008 | Williams et al. |
| 2008/0113748 A1 | 5/2008 | Williams et al. |
| 2008/0113749 A1 | 5/2008 | Williams et al. |
| 2008/0113755 A1 | 5/2008 | Rasmussen et al. |
| 2008/0113756 A1 | 5/2008 | Williams et al. |
| 2008/0113775 A1 | 5/2008 | Williams et al. |
| 2008/0125210 A1 | 5/2008 | Iwamoto |
| 2008/0125219 A1 | 5/2008 | Williams et al. |
| 2008/0136741 A1 | 6/2008 | Williams et al. |
| 2008/0152842 A1 | 6/2008 | Searle |
| 2008/0153573 A1 | 6/2008 | Okada |
| 2008/0153574 A1 | 6/2008 | Yoshizawa |
| 2008/0153575 A1 | 6/2008 | Okada |
| 2008/0161087 A1 | 7/2008 | Okada |

(56) References Cited

U.S. PATENT DOCUMENTS

| | | | |
|---|---|---|---|
| 2008/0161093 A1 | 7/2008 | Okada |
| 2008/0165132 A1 | 7/2008 | Weiss et al. |
| 2008/0167913 A1 | 7/2008 | Wiswell et al. |
| 2008/0176653 A1 | 7/2008 | Kishi |
| 2008/0182652 A1 | 7/2008 | Rasmussen et al. |
| 2008/0188283 A1 | 8/2008 | Okada |
| 2008/0214277 A1 | 9/2008 | Kishi |
| 2008/0284792 A1 | 11/2008 | Bell et al. |
| 2008/0311977 A1 | 12/2008 | Okada |
| 2009/0006292 A1 | 1/2009 | Block |
| 2009/0036208 A1 | 2/2009 | Pennington et al. |
| 2009/0061983 A1 | 3/2009 | Kaufman |
| 2009/0061984 A1 | 3/2009 | Yi |
| 2009/0069066 A1 | 3/2009 | Yoshizawa |
| 2009/0070709 A1 | 3/2009 | Engel |
| 2009/0075718 A1 | 3/2009 | Yoshizawa |
| 2009/0079667 A1 | 3/2009 | Schlottmann et al. |
| 2009/0082083 A1 | 3/2009 | Wilson et al. |
| 2009/0104969 A1 | 4/2009 | Paulsen et al. |
| 2009/0104989 A1 | 4/2009 | Williams et al. |
| 2009/0111577 A1 | 4/2009 | Mead |
| 2009/0117977 A1 | 5/2009 | Gelber et al. |
| 2009/0131145 A1 | 5/2009 | Aoki et al. |
| 2009/0131148 A1 | 5/2009 | Loose et al. |
| 2009/0137306 A1 | 5/2009 | Yoshizawa |
| 2009/0143141 A1 | 6/2009 | Wells et al. |
| 2009/0181758 A1 | 7/2009 | Loose et al. |
| 2009/0191946 A1 | 7/2009 | Thomas et al. |
| 2009/0203420 A1 | 8/2009 | Yoshizawa |
| 2009/0247276 A1 | 10/2009 | Okada |
| 2009/0253498 A1 | 10/2009 | Wolf et al. |
| 2009/0286589 A1 | 11/2009 | Rasmussen |
| 2009/0325686 A1 | 12/2009 | Davis et al. |
| 2010/0045601 A1 | 2/2010 | Engel et al. |
| 2010/0081502 A1 | 4/2010 | Rasmussen et al. |
| 2010/0093426 A1* | 4/2010 | Ozaki et al. ............... 463/20 |
| 2010/0115391 A1 | 5/2010 | Engel et al. |
| 2010/0115439 A1 | 5/2010 | Engel et al. |
| 2010/0130280 A1 | 5/2010 | Arezina et al. |
| 2010/0156922 A1 | 6/2010 | Bell et al. |
| 2010/0201623 A1 | 8/2010 | Engel et al. |
| 2010/0248577 A1 | 9/2010 | Bell et al. |
| 2010/0289819 A1 | 11/2010 | Singh et al. |
| 2011/0007089 A1 | 1/2011 | Bell et al. |
| 2011/0117987 A1 | 5/2011 | Aoki et al. |
| 2011/0124411 A1 | 5/2011 | Tanimura et al. |
| 2011/0201404 A1 | 8/2011 | Wells |
| 2011/0249026 A1* | 10/2011 | Singh ..................... 345/630 |
| 2011/0285609 A1 | 11/2011 | Engel |
| 2011/0310121 A1 | 12/2011 | Baron |
| 2012/0206574 A1* | 8/2012 | Shikata et al. ............. 348/46 |
| 2012/0306857 A1* | 12/2012 | Hayashida et al. ........... 345/419 |

FOREIGN PATENT DOCUMENTS

| | | |
|---|---|---|
| EP | 0 454 423 | 10/1991 |
| EP | 0 484 103 | 5/1992 |
| EP | 0 860 807 | 8/1998 |
| EP | 0 919 965 | 6/1999 |
| EP | 0 997 857 | 5/2000 |
| EP | 1 003 138 | 5/2000 |
| EP | 1 260 928 | 11/2002 |
| EP | 1 391 847 | 2/2004 |
| EP | 1 462 152 | 9/2004 |
| EP | 1 492 063 | 12/2004 |
| EP | 1 826 739 | 8/2007 |
| GB | 912685 | 12/1962 |
| GB | 1 464 896 | 2/1977 |
| GB | 2 120 506 | 11/1983 |
| GB | 2 201 821 | 9/1988 |
| GB | 2 253 300 | 9/1992 |
| GB | 2 316 214 | 2/1998 |
| JP | 64/054476 | 4/1989 |
| JP | 02/019182 | 1/1990 |
| JP | 04/220276 | 8/1992 |
| JP | 05/123438 | 5/1993 |
| JP | 05/123439 | 5/1993 |
| JP | 06/043425 | 2/1994 |
| JP | 06/142278 | 5/1994 |
| JP | 07/124290 | 5/1995 |
| JP | 08/173591 | 7/1996 |
| JP | 11/099240 | 4/1999 |
| JP | 11/137774 | 5/1999 |
| JP | 11/153970 | 6/1999 |
| JP | 11/244451 | 9/1999 |
| JP | 2000/011725 | 1/2000 |
| JP | 2000/267604 | 9/2000 |
| JP | 2000/300729 | 10/2000 |
| JP | 2000/350805 | 12/2000 |
| JP | 2001/062032 | 3/2001 |
| JP | 2001/161950 | 6/2001 |
| JP | 2001/190760 | 7/2001 |
| JP | 2001/238995 | 9/2001 |
| JP | 2001/252393 | 9/2001 |
| JP | 2001/252394 | 9/2001 |
| JP | 2001/305246 | 10/2001 |
| JP | 2001/327650 | 11/2001 |
| JP | 2002/017950 | 1/2002 |
| JP | 2002/078847 | 3/2002 |
| JP | 2002/085624 | 3/2002 |
| JP | 2002/113150 | 4/2002 |
| JP | 2004/089707 | 3/2004 |
| JP | 2004/105616 | 4/2004 |
| JP | 2004/166879 | 6/2004 |
| JP | 2005/253561 | 9/2005 |
| JP | 2005/266387 | 9/2005 |
| JP | 2005/274906 | 10/2005 |
| JP | 2005/274907 | 10/2005 |
| JP | 2005/283864 | 10/2005 |
| JP | 2006/059607 | 3/2006 |
| JP | 2006/346226 | 12/2006 |
| WO | WO 93/13446 | 7/1993 |
| WO | WO 99/42889 | 8/1999 |
| WO | WO 99/44095 | 9/1999 |
| WO | WO 99/53454 | 10/1999 |
| WO | WO 00/32286 | 6/2000 |
| WO | WO 01/09664 | 2/2001 |
| WO | WO 01/15127 | 3/2001 |
| WO | WO 01/15128 | 3/2001 |
| WO | WO 01/15132 | 3/2001 |
| WO | WO 01/38926 | 5/2001 |
| WO | WO 01/55127 | 8/2001 |
| WO | WO 02/41046 | 5/2002 |
| WO | WO 02/084637 | 10/2002 |
| WO | WO 02/086610 | 10/2002 |
| WO | WO 02/089102 | 11/2002 |
| WO | WO 03/001486 | 1/2003 |
| WO | WO 03/023491 | 3/2003 |
| WO | WO 03/032058 | 4/2003 |
| WO | WO 03/039699 | 5/2003 |
| WO | WO 03/040820 | 5/2003 |
| WO | WO 03/079094 | 9/2003 |
| WO | WO 2004/008226 | 1/2004 |
| WO | WO 2004/023825 | 3/2004 |
| WO | WO 2004/025583 | 3/2004 |
| WO | WO 2004/036286 | 4/2004 |
| WO | WO 2004/102520 | 11/2004 |
| WO | WO 2004/001486 | 12/2004 |
| WO | WO 2004/001488 | 12/2004 |
| WO | WO 2004/002143 | 12/2004 |
| WO | WO 2006/034192 | 3/2006 |
| WO | WO 2006/036948 | 4/2006 |
| WO | WO 2006/038819 | 4/2006 |
| WO | WO 2006/112740 | 10/2006 |
| WO | WO 2006/124976 | 11/2006 |
| WO | WO 2007/011717 | 1/2007 |
| WO | WO 2007/040413 | 4/2007 |
| WO | WO 2007/053349 | 5/2007 |
| WO | WO 2008/011049 | 1/2008 |
| WO | WO 2008/028153 | 3/2008 |
| WO | WO 2008/048857 | 4/2008 |
| WO | WO 2008/061068 | 5/2008 |
| WO | WO 2008/063908 | 5/2008 |

(56) References Cited

FOREIGN PATENT DOCUMENTS

| WO | WO 2008/063914 | 5/2008 |
|----|----|----|
| WO | WO 2008/063952 | 5/2008 |
| WO | WO 2008/063956 | 5/2008 |
| WO | WO 2008/063968 | 5/2008 |
| WO | WO 2008/063969 | 5/2008 |
| WO | WO 2008/063971 | 5/2008 |
| WO | WO 2008/079543 | 7/2008 |
| WO | WO 2009/029720 | 3/2009 |
| WO | WO 2009/039245 | 3/2009 |
| WO | WO 2009/039295 | 3/2009 |
| WO | WO 2009/054861 | 4/2009 |
| WO | WO 2010/023537 | 3/2010 |
| WO | WO 2010/039411 | 4/2010 |

OTHER PUBLICATIONS

"Bank on our new games" Advertisement, Slotline Special Show Edition (1 page).

* cited by examiner

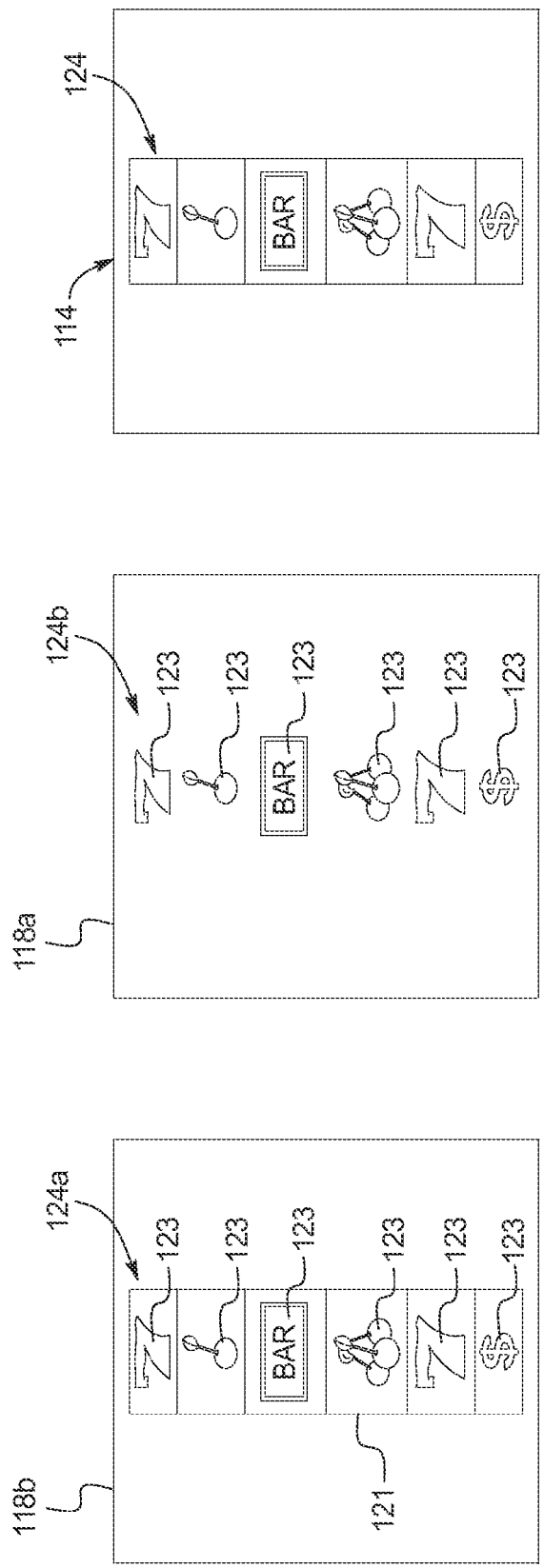

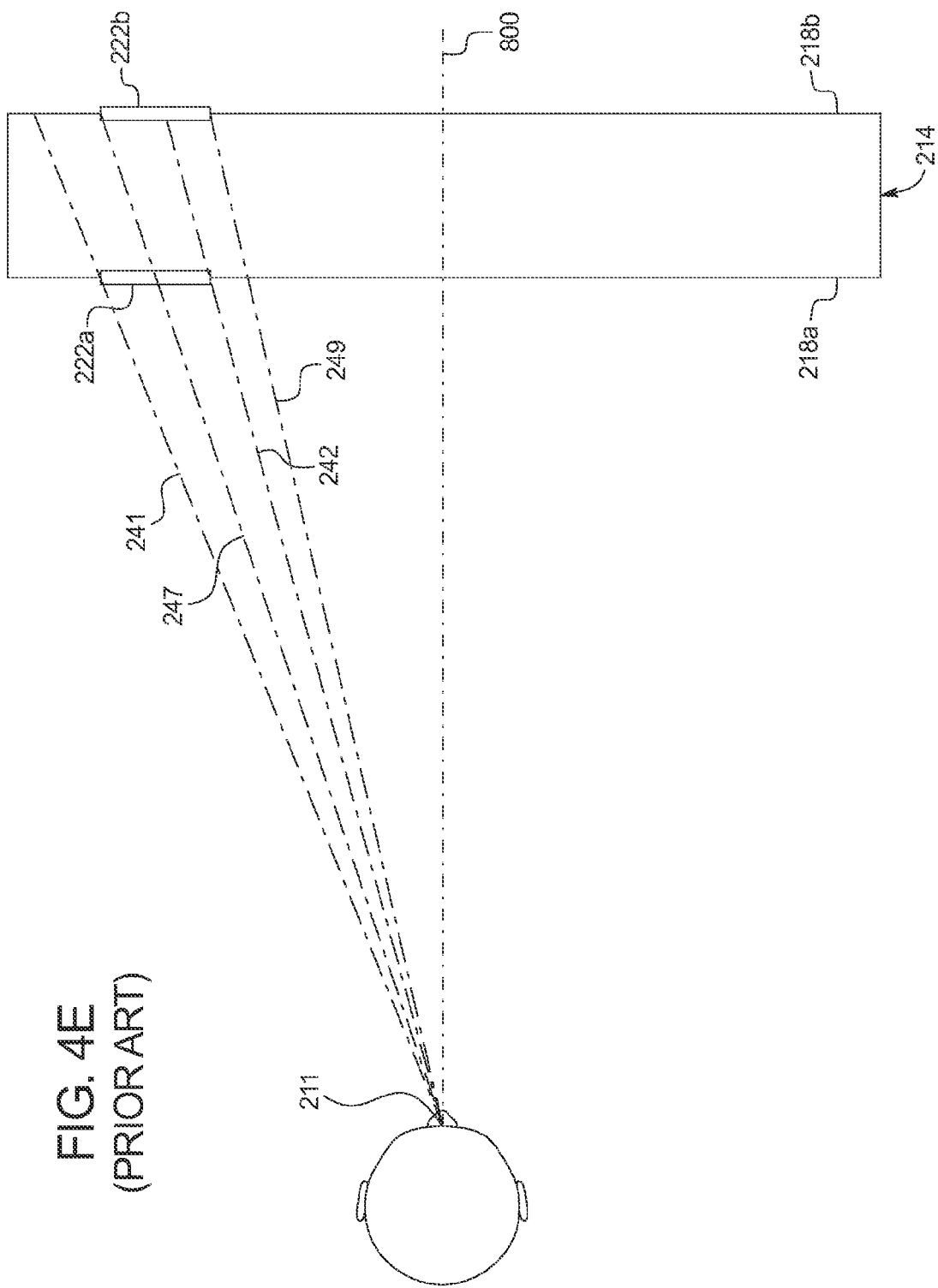

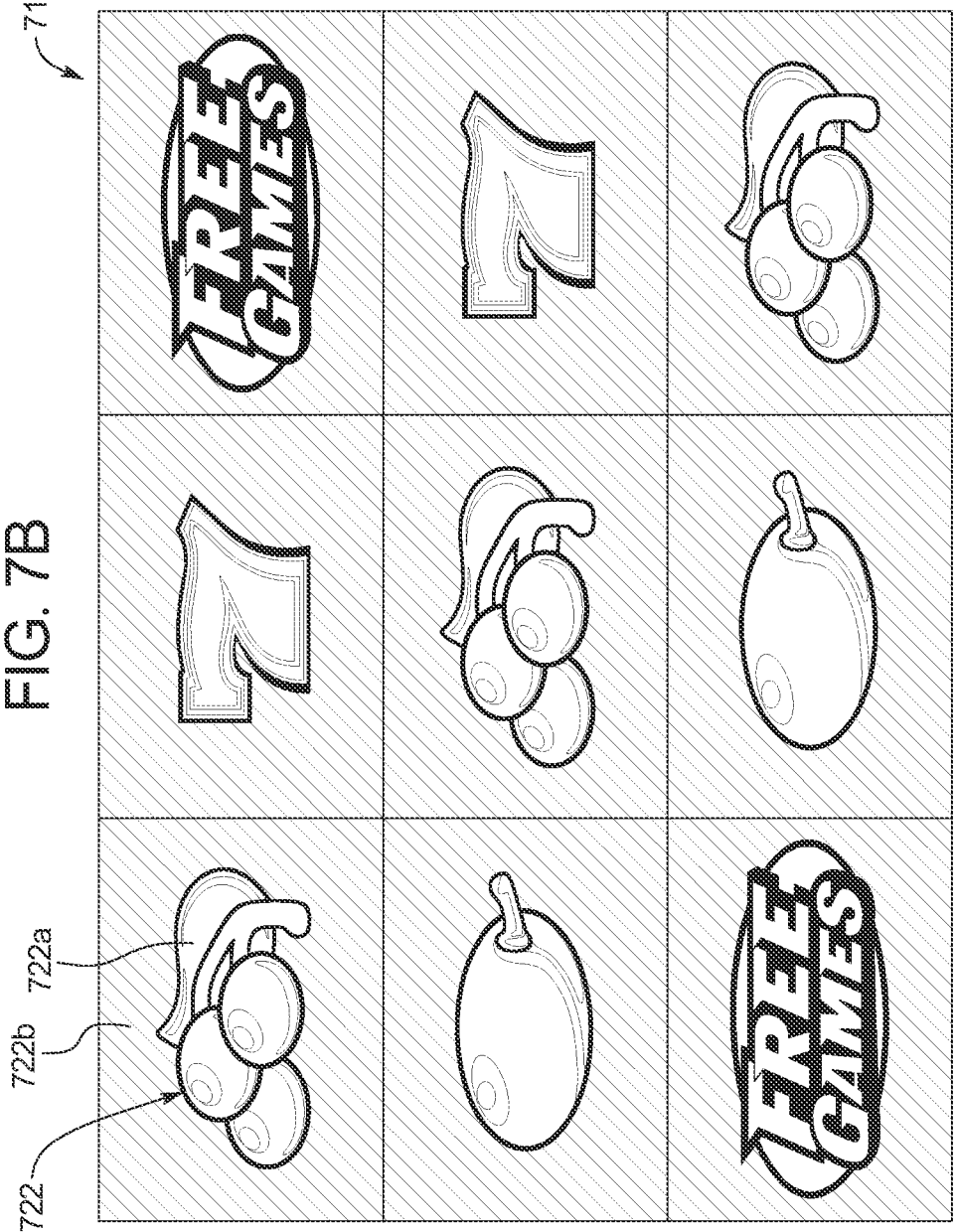

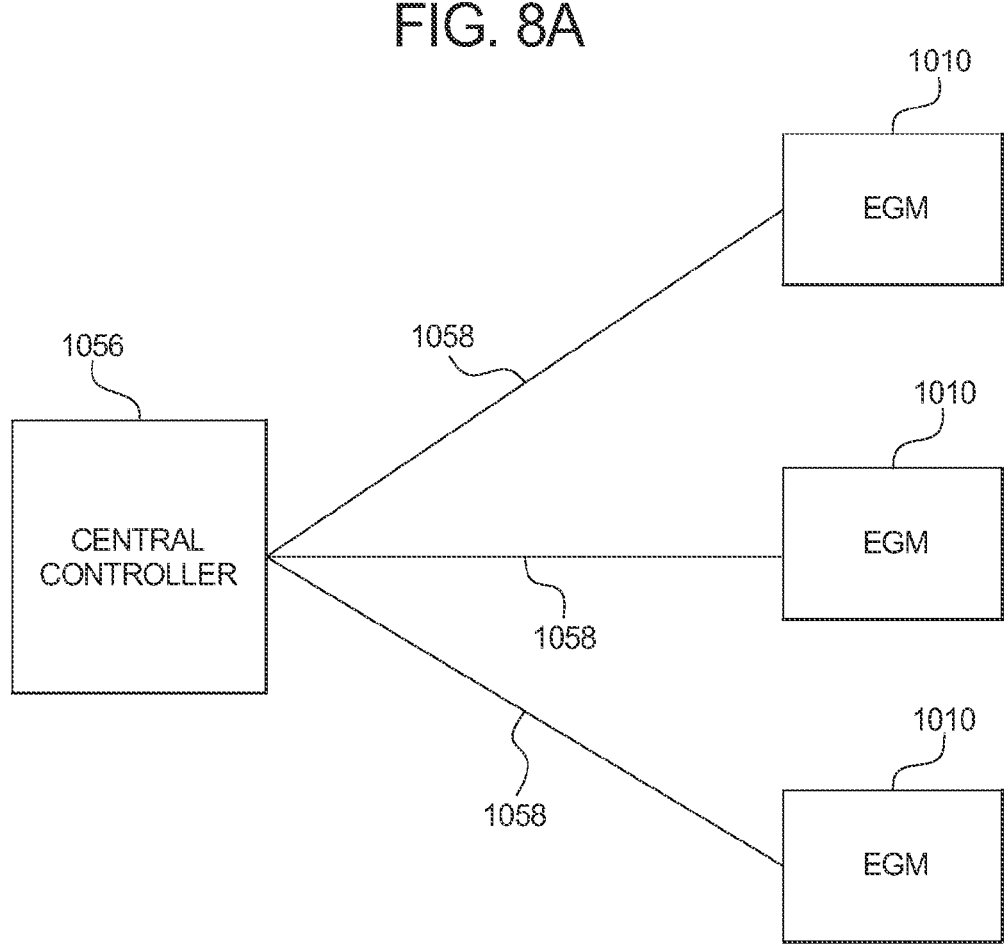

GAMING SYSTEM HAVING REDUCED APPEARANCE OF PARALLAX ARTIFACTS ON DISPLAY DEVICES INCLUDING MULTIPLE DISPLAY SCREENS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Various known gaming systems display three-dimensional images to players. Certain of these known gaming systems generate virtual three-dimensional images and display those virtual three-dimensional images on a single display screen. Since these known gaming systems employ only a single display screen to display these virtual three-dimensional images, these virtual three-dimensional images have simulated depth, not actual depth. These known gaming systems generate such virtual three dimensional images using a variety of techniques, such as shading, highlighting, and/or perspective techniques, to generate an image having a perceived depth (from a player's point of view) when displayed on the single display device. These virtual three-dimensional images thus cause the human eye to perceive the virtual three-dimensional images as having depth when in fact the images have no actual depth.

Other known gaming systems generate three-dimensional images using a display device including two or more aligned display screens each separated by a predetermined distance. The use of such multiple aligned display screens enables these known gaming systems to generate three-dimensional images having actual depth. More specifically, these known gaming systems in part use the predetermined distances between the display screens to add depth to images such that they are displayed in three actual dimensions. One such known gaming system generates and displays an image in three actual dimensions on a display device having two aligned display screens by displaying that image on each of the two display screens at a same distance from a horizontal reference plane and a same distance from a vertical reference plane. That is, for each portion of the image, this known gaming system displays that portion of the image: (a) on a first display screen at a first distance from the horizontal reference plane and a first distance from the vertical reference plane, and (b) on a second display screen at the first distance from the horizontal reference plane and the first distance from the vertical reference plane. The predetermined distance between the two display screens adds actual depth to the resultant image displayed by the display device; that is, the resultant image is displayed to the player in three actual dimensions. Another such known gaming system generates and displays an image in three actual dimensions on a display device having two aligned display screens by displaying different portions of that image on each of the two display screens. The predetermined distance between the two display screens adds actual depth to the resultant image displayed by the display device; that is, the portion of the image displayed on one of the display screens appears closer to the player than the portion of the image displayed on the other one of the display screens. Thus, the resultant image is displayed to the player in three actual dimensions.

While the predetermined distance between the display screens enables such known gaming systems to display images to a player in three actual dimensions, it also causes parallax artifacts to appear to the player in certain instances. More specifically, when a same image is displayed on each of two aligned display screens at a same distance from a horizontal reference plane and a same distance from a vertical reference plane, certain portions of the image displayed on a front display screen do not fall on a same line of sight of the player as the corresponding portions of the image displayed on a rear display screen. That is, depending upon the viewpoint of the player, in these instances the player typically is able to see portions of the image displayed on both of the display screens rather than a single cohesive three-dimensional image.

FIGS. 1A, 1B, 2A, 2B, 2C, 2D, and 2E illustrate an example of the problem caused by such parallax artifacts. FIG. 1A illustrates an example of one embodiment of a gaming system, which in this example is an electronic gaming machine 10 ("EGM," as described below). EGM 10 includes a cabinet or housing 12 that houses a display device 14 and a touch screen 16. Display device 14 includes an exterior display screen 18a and an interior display screen 18b. Exterior display screen 18a and interior display screen 18b each include a display surface. EGM 10 includes a processor (not shown) configured to operate with exterior display screen 18a and interior display screen 18b to display one or more images on the display screens of exterior display screen 18a and interior display screen 18b. Exterior display screen 18a and interior display screen 18b are mounted and oriented within housing 12 such that at least one line of sight of a player, such as line of sight 20 extending from a viewpoint 11 of the player, intersects both the display surface of exterior display screen 18a and the display surface of interior display screen 18b. Display device 14 also includes a back lighting source 19 positioned behind and aligned with exterior display screen 18a and interior display screen 18b. As shown in FIG. 1A, exterior display screen 18a and interior display screen 18b are separated by a predetermined distance db1, which is the distance from the display surface of exterior display screen 18a to the display surface of interior display screen 18b along a line perpendicular to the display surfaces of exterior display screen 18a and interior display screen 18b.

FIG. 1B illustrates an exploded perspective view of exterior display screen 18a, interior display screen 18b, and viewpoint 11 of the player. FIG. 1B also illustrates a first reference plane 700, which is a horizontal plane in this example, and a second reference plane 800, which is a vertical plane in this example. First reference plane 700 and second reference plane 800 are defined based on the location of viewpoint 11 of the player. More specifically, in this example, viewpoint 11 of the player acts as the origin of a standard (x,y) coordinate axis, first reference plane 700 extends from the created x-axis into the display screens, and second reference plane 800 extends from the created y-axis into the display screens.

FIG. 2A illustrates a front view of interior display screen 18b as viewed from viewpoint 11 of the player, FIG. 2B illustrates a front view of exterior display screen 18a as viewed from viewpoint 11 of the player, and FIG. 2C illustrates a front view of display device 14 (which includes exterior display screen 18a and interior display screen 18b) as viewed from viewpoint 11 of the player. As shown in FIGS. 2A, 2B, and 2C, exterior display screen 18a and interior display screen 18b co-act to display resultant three-dimensional images 22, 24, and 26 on display device 14. Resultant three-dimensional images 22, 24, and 26 are identical outlines of a square.

To provide resultant images 22, 24, and 26 in three dimensions, interior display screen 18b displays image 22b (i.e., the square, as shown in FIG. 2A) and exterior display screen 18a displays image 22a (i.e., the square, as shown in FIG. 2B) at a same distance from first reference plane 700 and a same distance from second reference plane 800. For example, the bottom right corner of image 22a is displayed on exterior display screen 18a a first distance from first reference plane 700 and a second distance from second reference plane 800. Accordingly, in this example, the corresponding bottom right corner of image 22b is displayed on interior display screen 18b the first distance from first reference plane 700 and the second distance from second reference plane 800. Similarly, interior display screen 18b displays image 24b (i.e., the square, as shown in FIG. 2A) and exterior display screen 18a displays image 24a (i.e., the square, as shown in FIG. 2B) at a same distance from first reference plane 700 and a same distance from second reference plane 800, and interior display screen 18b displays image 26b (i.e., the square, as shown in FIG. 2A) and exterior display screen 18a displays image 26a (i.e., the square, as shown in FIG. 2B) at a same distance from first reference plane 700 and a same distance from second reference plane 800.

As a result, display device 14 displays resultant three-dimensional images 22, 24, and 26 (i.e., the square), as illustrated in FIG. 2C. Since both exterior display screen 18a and interior display screen 18b display the same images of the square, resultant three-dimensional images 22, 24, and 26 are formed in three actual dimensions. The depth of resultant three-dimensional images 22, 24, and 26 are equal to (or otherwise based in part on or derived from) the predetermined distance dbl that separates the display surface of exterior display screen 18a and the display surface of interior display screen 18b. However, it should be appreciated from FIGS. 2A, 2B, and 2C that as viewed from viewpoint 11 of the player, which in this example is located at the intersection of the first reference plane and the second reference plane a certain distance from the exterior display screen, the combination of: (a) the predetermined distance dbl that separates the display surface of exterior display screen 18a and the display surface of interior display screen 18b; and (b) the fact that, in this example, images 22a and 22b are displayed at a same distance from first reference plane 700 and a same distance from second reference plane 800, images 24a and 24b are displayed at a same distance from first reference plane 700 and a same distance from second reference plane 800, and images 26a and 26b are displayed at are displayed at a same distance from first reference plane 700 and a same distance from second reference plane 800 causes vertical and horizontal parallax artifacts to appear in resultant three-dimensional images 22, 24, and 26 that, from the player's point of view, distort resultant three-dimensional images 22, 24, and 26.

More specifically, as shown in FIG. 2C, as viewed from viewpoint 11 of the player: (a) each portion of image 22b displayed on interior display screen 18b appears to be closer to first reference plane 700 and second reference plane 800 than the corresponding portion of image 22a displayed on exterior display screen 18a, (b) each portion of image 24b displayed on interior display screen 18b appears to be closer to first reference plane 700 and second reference plane 800 than the corresponding portion of image 22a displayed on exterior display screen 18a, and (c) each portion of image 26b displayed on interior display screen 18b appears to be closer to first reference plane 700 and second reference plane 800 than the corresponding portion of image 26a displayed on exterior display screen 18a. Accordingly, from viewpoint 11 of the player: (a) images 22a and 22b do not co-act to form a cohesive resultant three-dimensional image, (b) images 24a and 24b do not co-act to form a cohesive resultant three-dimensional image, and (c) images 26a and 26b do not co-act to form a cohesive resultant three-dimensional image. It should be appreciated that the parallax effect in FIG. 2C is slightly enhanced for clarity. It should further be appreciated by comparing resultant three-dimensional image 24 with resultant three-dimensional images 22 and 26 that the effect of the parallax artifacts worsens the further the images are from the viewpoint of the player.

FIG. 2D more specifically illustrates the vertical component of these parallax artifacts. FIG. 2D illustrates a side diagrammic view of display device 14 in which exterior display screen 18a displays images 22a, 24a, and 26a and interior display screen 18b displays images 22b, 24b, and 26b. It should be appreciated that certain of the components of FIG. 2D are slightly enhanced for clarity. As explained above, it should be appreciated from FIG. 2D that the corresponding portions of: (a) images 22a and 22b are displayed on exterior display screen 18a and interior display screen 18b, respectively, a same distance from first reference plane 700; (b) images 24a and 24b are displayed on exterior display screen 18a and interior display screen 18b, respectively, a same distance from first reference plane 700; and (c) images 26a and 26b are displayed on exterior display screen 18a and interior display screen 18b, respectively, a same distance from first reference plane 700. For example, the corresponding bottom edges of images 22a and 22b are both located a same distance from first reference plane 700.

Line of sight 31 extends from viewpoint 11 of the player and intersects the top edge of image 22a displayed on exterior display screen 18a (i.e., the top edge of the square displayed on exterior display screen 18a in this example). Line of sight 31 does not, however, intersect the top edge of image 22b displayed on interior display screen 18b (i.e., the top edge of the square displayed on interior display screen 18b in this example). That is, the top edge of image 22a displayed on exterior display screen 18a falls on a different line of sight than the top edge of image 22b displayed on interior display screen 18b. Accordingly, in this example (and as illustrated in FIG. 2C), the player views the top edges of both image 22a displayed on exterior display screen 18a and image 22b displayed on interior display screen 18b. A similar effect exists with respect to: (a) images 22a and 22b and line of sight 32, (b) images 24a and 24b and lines of sight 33 and 34, and (c) images 26a and 26b and lines of sight 35 and 36. This vertical component of the parallax artifacts results in the player viewing a distorted resultant three-dimensional image rather than a cohesive resultant three-dimensional image.

FIG. 2E more specifically illustrates the horizontal component of these parallax artifacts. FIG. 2E illustrates a top diagrammic view of display device 14 in which exterior display screen 18a displays images 22a, 24a, and 26a and interior display screen 18b displays images 22b, 24b, and 26b. It should be appreciated that certain of the components of FIG. 2E are slightly enhanced for clarity. As explained above, it should be appreciated from FIG. 2E that the corresponding portions of: (a) images 22a and 22b are displayed on exterior display screen 18a and interior display screen 18b, respectively, a same distance from second reference plane 800; (b) images 24a and 24b are displayed on exterior display screen 18a and interior display screen 18b, respectively, a same distance from second reference plane 800; and (c) 26a and 26b are displayed on exterior display screen 18a and interior display screen 18b, respectively, a same distance from second reference plane 800. For example, the corresponding right edges of images 22a and 22b are both located a same distance from second reference plane 800.

Line of sight 41 extends from viewpoint 11 of the player and intersects the left edge of image 22a displayed on exterior display screen 18a (i.e., the left edge of the square displayed on exterior display screen 18a in this example). Line of sight 41 does not, however, intersect the left edge of image 22b displayed on interior display screen 18b (i.e., the left edge of the square displayed on interior display screen 18b in this example). That is, the left edge of image 22a displayed on exterior display screen 18a falls on a different line of sight than the left edge of image 22b displayed on interior display screen 18b. Accordingly, in this example (and as illustrated in FIG. 2C), the player views the left edges of both image 22a displayed on exterior display screen 18a and image 22b displayed on interior display screen 18b. A similar effect exists with respect to: (a) images 22a and 22b and line of sight 42, (b) images 24a and 24b and lines of sight 43 and 44, and (c) images 26a and 26b and lines of sight 45 and 46. This horizontal component of the parallax artifacts results in the player viewing a distorted resultant three-dimensional image rather than a cohesive resultant three-dimensional image.

One proposed solution to reduce and/or eliminate these parallax artifacts involves feathering, softening, or blurring the edges of the image displayed on the interior or rear display screen (i.e., the display screen positioned further from the player). This makes it more difficult for a player to view the edges of the image displayed on the rear display screen. Another proposed solution to reduce and/or eliminate these parallax artifacts involves choking or scaling down the size of the image displayed on the interior display screen. This reduces the appearance of parallax artifacts relatively close to the viewpoint of the player. Yet another proposed solution to reduce and/or eliminate these parallax artifacts involves both feathering, softening, or blurring the edges of and choking the size of the image displayed on the interior display screen. These proposed solutions have multiple significant drawbacks. Feathering, softening, or blurring the edges of the image displayed on the interior display screen requires an artist to create such an image and the gaming system to render and display that image, which uses a relatively large amount of computing resources. Additionally, feathering, softening, or blurring the edges of the image displayed on the interior display screen may somewhat reduce the effect of the parallax artifacts, but does not completely eliminate the parallax artifacts. Similarly, choking or scaling down the size of the image displayed on the interior display screen also requires a relatively large amount of computing resources to scale that image down and to render that image. Additionally, choking or scaling down the size of that image somewhat reduces the appearance of parallax artifacts relatively close to the viewpoint of the player, but does not completely eliminate the appearance of parallax artifacts, especially with respect to images displayed relatively far from the player's viewpoint. That is, this proposed solution assumes that the error caused by these parallax artifacts is constant, no matter where the three-dimensional images are displayed in relation to the viewpoint of the player, when in practice the parallax artifacts become more significant and apparent to players as the three-dimensional images are displayed further from the player's viewpoint.

Accordingly, there is a continuing need for a gaming system including a display device having multiple display screens and that is configured to generate and display images in three actual dimensions while reducing or eliminating the appearance of parallax artifacts.

SUMMARY

Various embodiments of the present disclosure provide gaming systems having reduced appearance of parallax artifacts on display devices including multiple display screens. Generally, the gaming system of the present disclosure determines a location on a first display screen of a display device at which to display a portion of a first image and subsequently determines, based on that determined location and one or more other variables, a different location on a second display screen of the display device at which to display a portion of a second image such that the appearance of parallax artifacts associated with the first image and the second image is reduced or eliminated.

More specifically, in one embodiment the gaming system includes a display device including a first display screen and a second display screen. The first and second display screens are aligned such that at least one line of sight of a player extends through both the first display screen and the second display screen. In this embodiment, the gaming system determines a first location on the first display screen at which to display a portion of a first image. The first location is a first distance from a first reference plane and a first distance from a second reference plane, wherein the first reference plane and the second reference plane are perpendicular. The gaming system determines a second location on the second display screen at which to display a portion of a second image. The second location is a second distance from the first reference plane and a second distance from the second reference plane. In this embodiment, at least one of: (a) the first distance from the first reference plane and the second distance from the first reference plane are different, and (b) the first distance from the second reference plane and the second distance from the second reference plane are different. The at least one processor determines the second location based on a distance separating the player from the first display screen and the determined first location on the first display screen at which to display the portion of the first image. The gaming system displays the portion of the first image at the determined first location on the first display screen and the portion of the second image at the determined second location on the second display screen such that parallax artifacts associated with the first image and the second image are reduced or eliminated.

In other words, in one embodiment, to eliminate the appearance of parallax artifacts caused by the display of: (a) a portion of a first image on a first display screen at a first distance from a first reference plane and a first distance from a second reference plane, and (b) that same portion of the first image on a second display screen at that same first distance from the first reference plane and that same first distance from the second reference plane, the gaming system instead displays the portion of the first image on the second display screen at: (a) a second different distance from the first reference plane, and/or (b) a second difference distance from the second reference plane. The second different distances are determined based on the first distances such that the corresponding portions of the first images fall on a same line of sight of the player, thereby eliminating any parallax artifacts associated with that portion of the first image.

Accordingly, the present disclosure utilizes known, estimated, or measurable variables to display an actual three-dimensional image on a display device including multiple display screens while reducing or eliminating the appearance of parallax artifacts caused by the distance between those display screens.

Additional features and advantages are described herein, and will be apparent from, the following Detailed Description and the Figures.

BRIEF DESCRIPTION OF THE FIGURES

FIG. 3A illustrates a front view of the interior display screen of an example of another embodiment of an EGM, and illustrates the interior display screen displaying an image of a reel outline and symbols.

FIG. 3B illustrates a front view of the exterior display screen of the EGM of FIG. 3A, and illustrates the exterior display screen displaying an image of the symbols.

FIG. 3C illustrates a front view of the display device of the EGM of FIGS. 3A and 3B, and illustrates the display device displaying a resultant three-dimensional image of a slot machine reel.

FIG. 4E illustrates a top diagrammic view of the display device of the EGM of FIGS. 4A, 4B, 4C, and 4D, and illustrates a plurality of lines of sight extending from the viewpoint of the player to the image displayed on the exterior and interior display screens, wherein certain of the components are slightly enhanced for clarity.

FIG. 7B illustrates a front view of the display device of an example of another embodiment of the gaming system of the present disclosure, and illustrates the display device displaying a resultant three-dimensional image of a plurality of symbols without parallax artifacts.

FIG. 8A is a schematic block diagram of one embodiment of the gaming system of the present disclosure, wherein the gaming system includes a central server, central controller, or remote host configured to communicate with a plurality of EGMs over a data network or remote communications link.

DETAILED DESCRIPTION

Figure 1A:
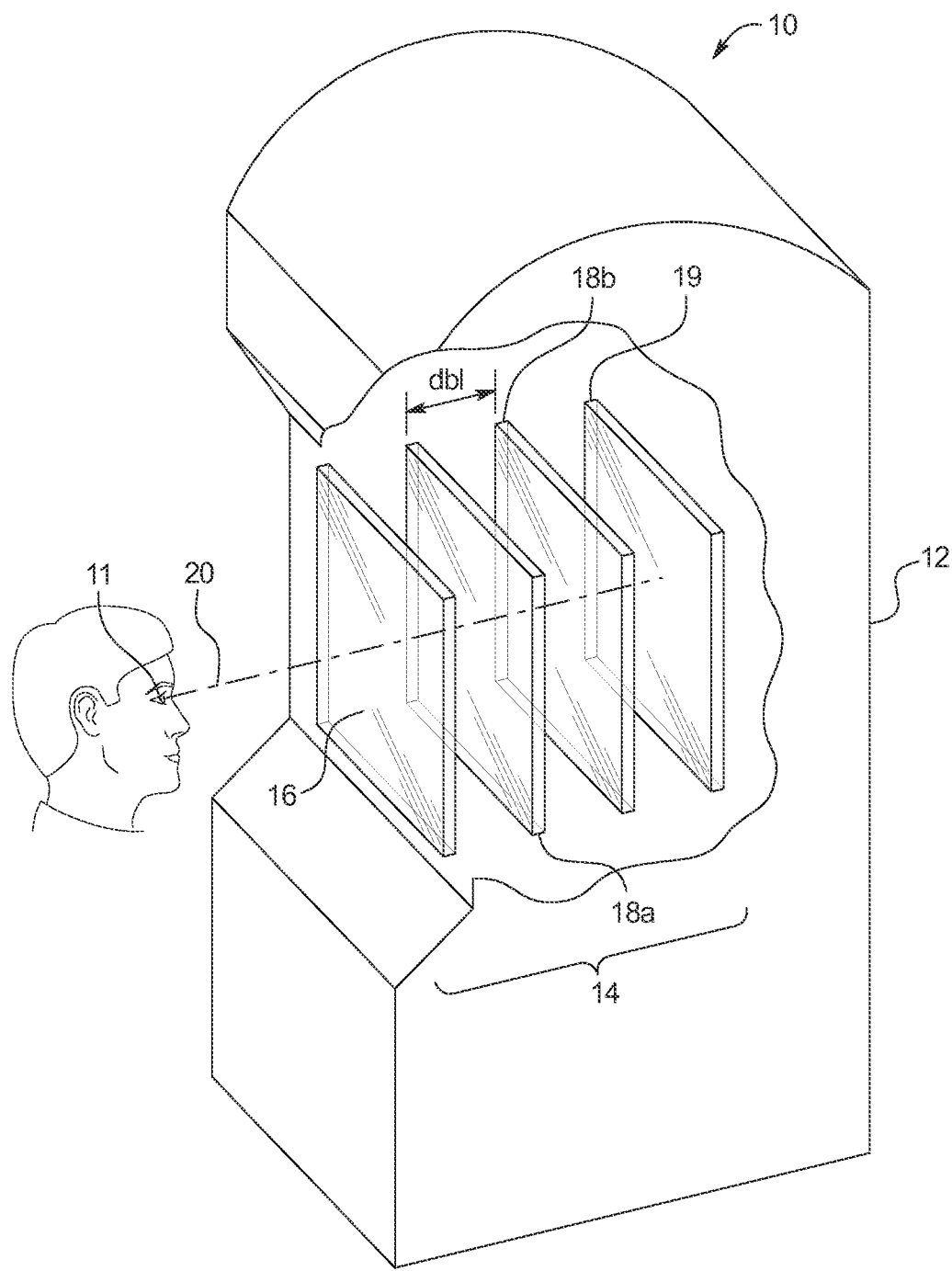
FIG. 1A is a perspective view of an example of one embodiment of an EGM including a touch screen, an exterior display screen, an interior display screen, and a lighting source.
Figure 1B:
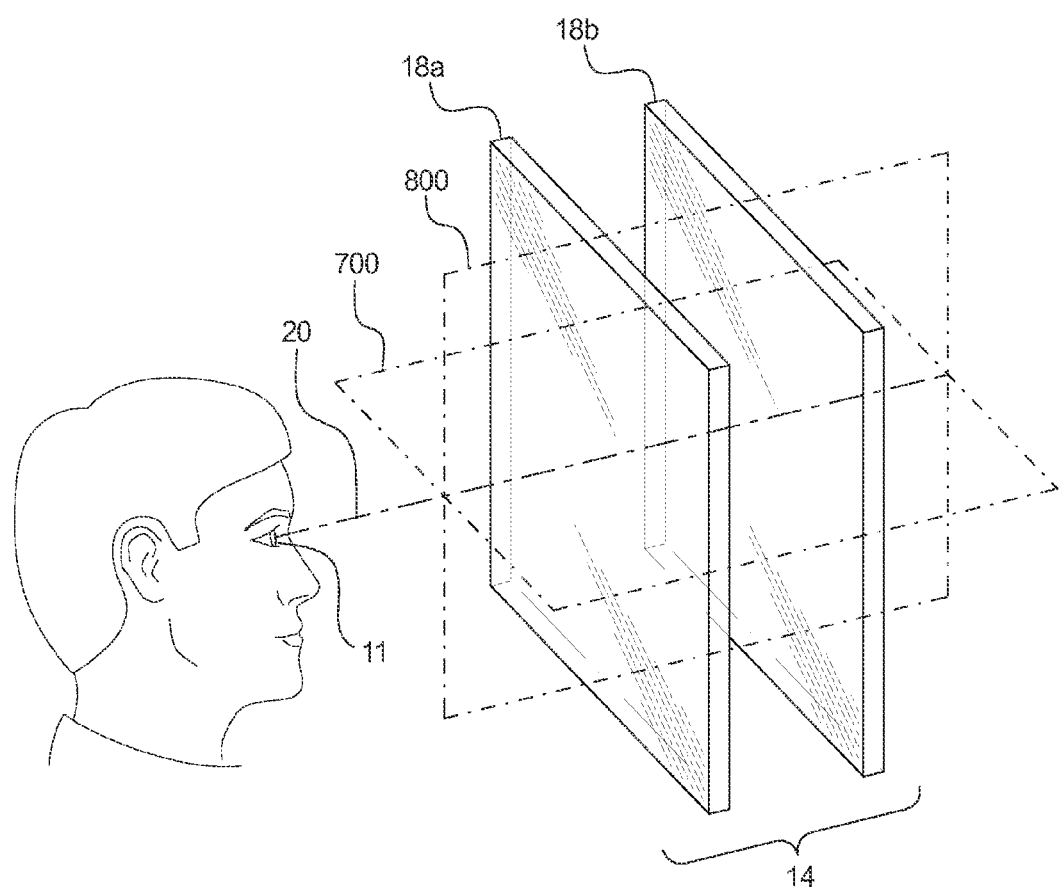
FIG. 1B illustrates an exploded perspective view of the exterior display screen and the interior display screen of the EGM of FIG. 1A, and illustrates a first reference plane and a second reference plane.
Figure 2A:
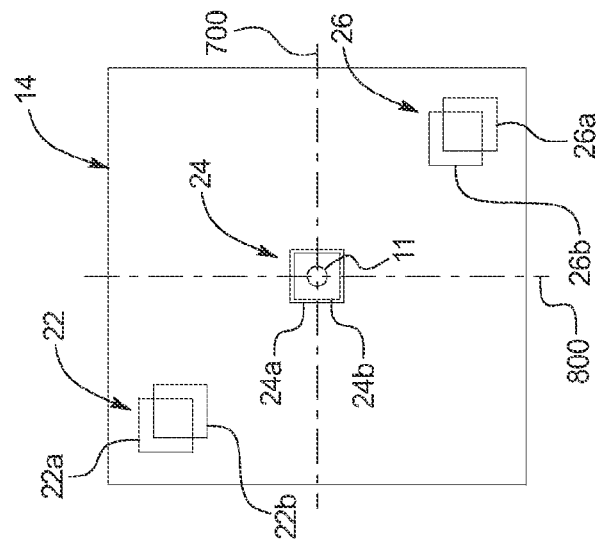
FIG. 2A illustrates a front view of the interior display screen of an example of another embodiment of an EGM, and illustrates the interior display screen displaying three images of a square.
Figure 2B:
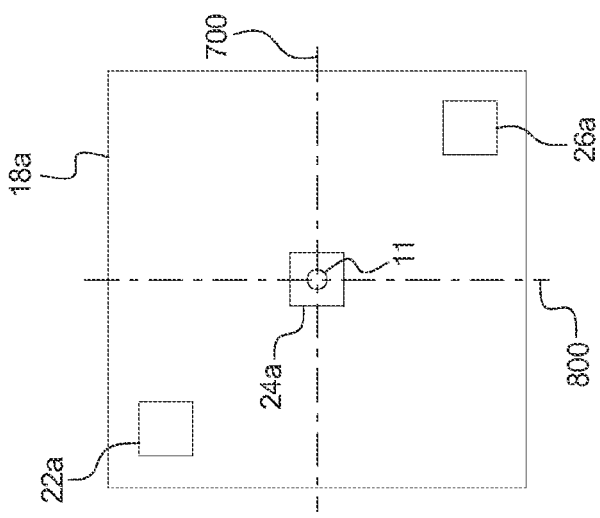
FIG. 2B illustrates a front view of the exterior display screen of the EGM of FIG. 2A, and illustrates the exterior display screen displaying three images of a square.
Figure 2C:
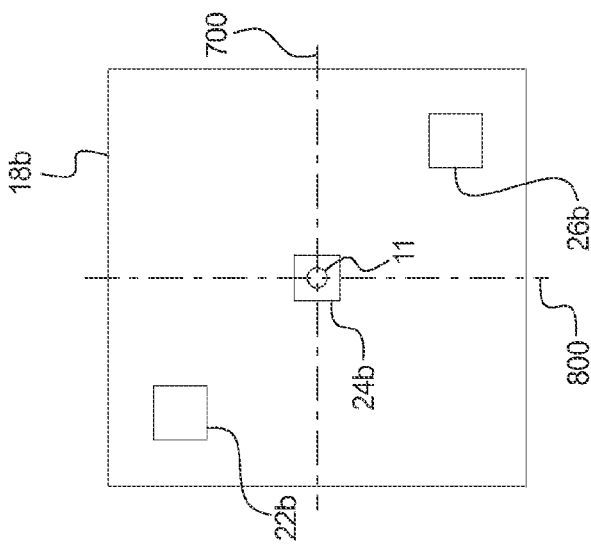
FIG. 2C illustrates a front view of the display device of the EGM of FIGS. 2A and 2B, and illustrates the display device displaying three resultant three-dimensional images of a square, each of which includes parallax artifacts, wherein the parallax effect is enhanced for clarity.
Figure 2D:
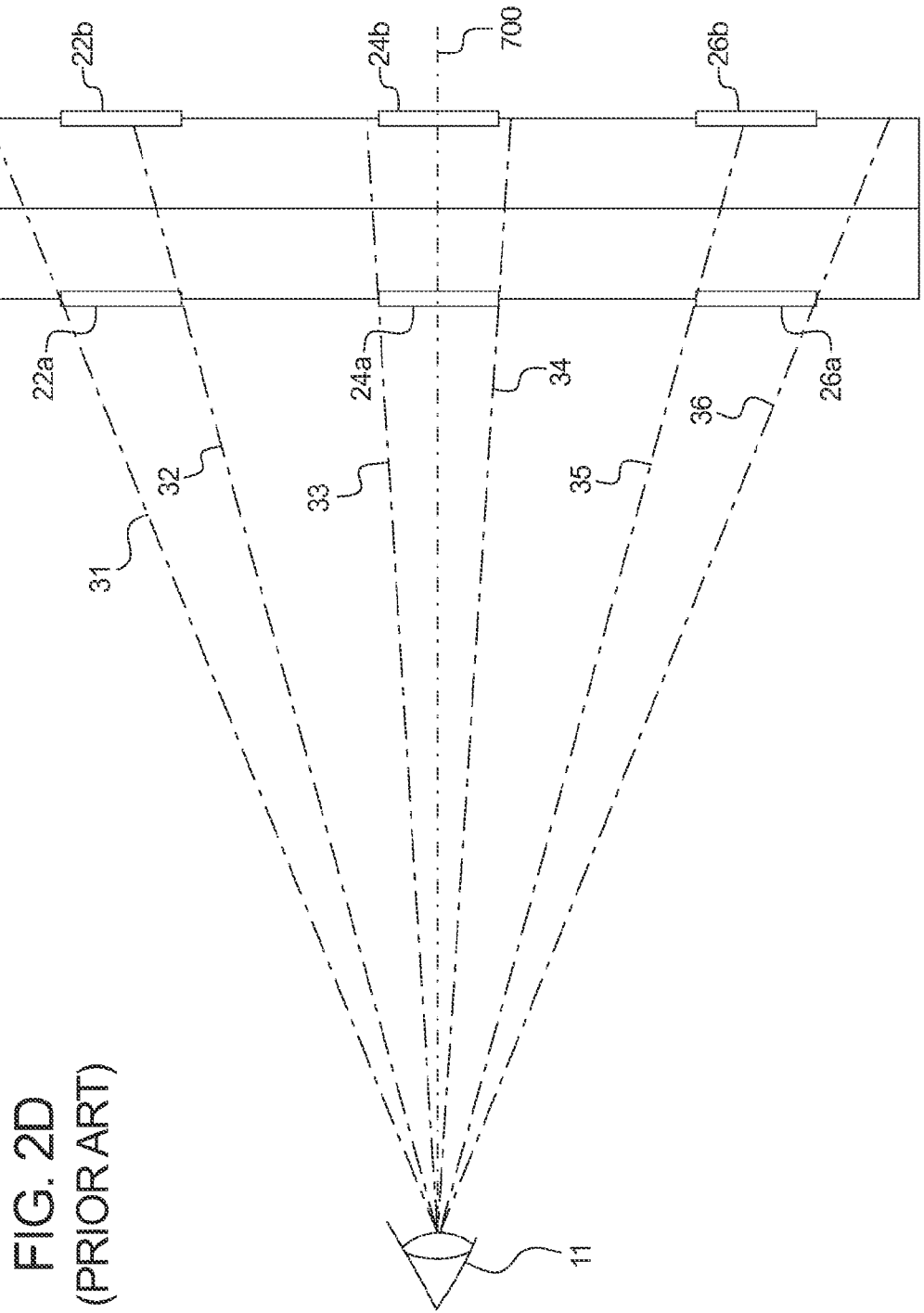
FIG. 2D illustrates a side diagrammic view of the display device of the EGM of FIGS. 2A, 2B, and 2C, and illustrates a plurality of lines of sight extending from a viewpoint of a player to the images displayed on the exterior and interior display screens, wherein certain of the components are slightly enhanced for clarity.
Figure 2E:
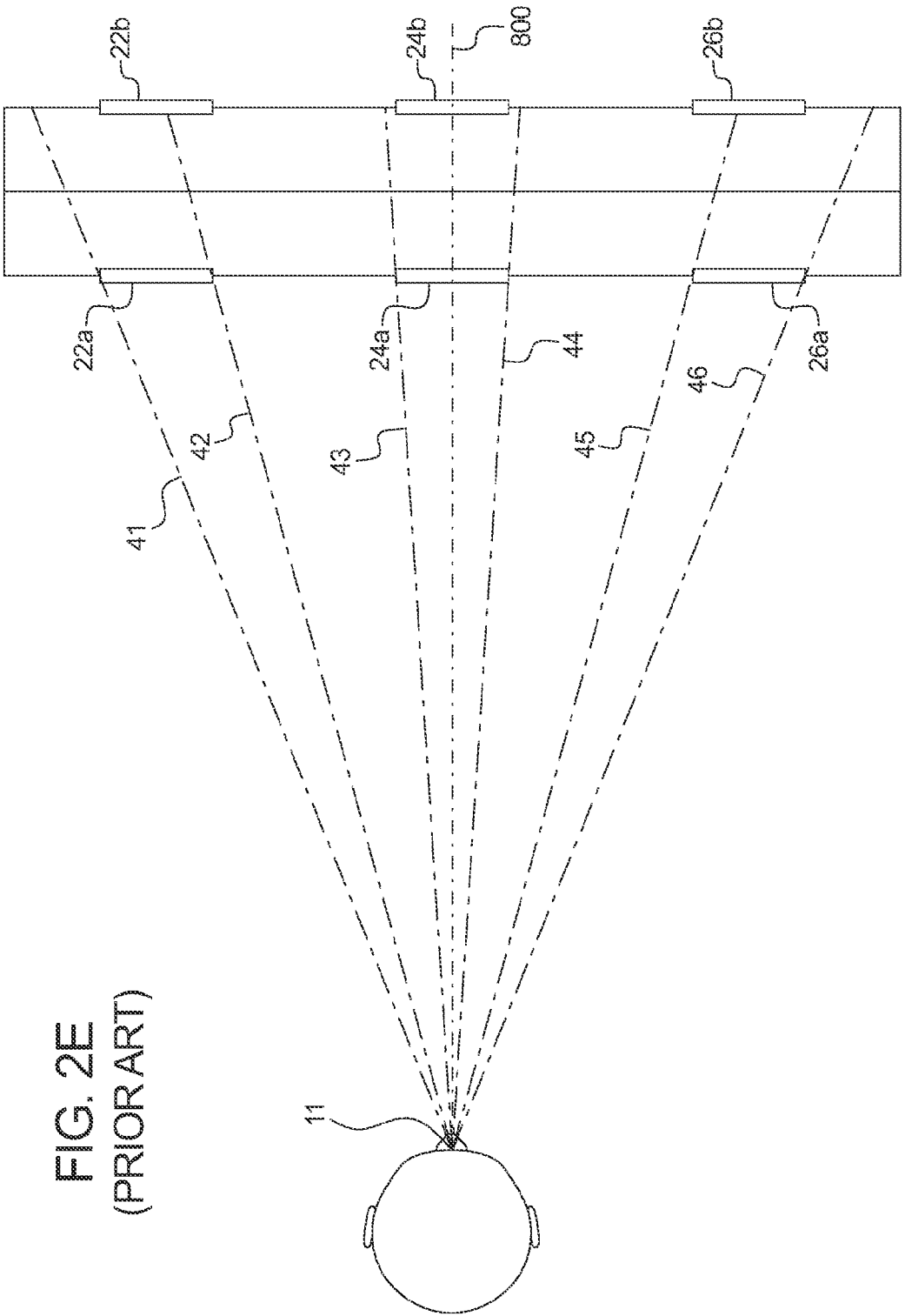
FIG. 2E illustrates a top diagrammic view of the display device of the EGM of FIGS. 2A, 2B, 2C, and 2D, and illustrates a plurality of lines of sight extending from the viewpoint of the player to the images displayed on the exterior and interior display screens, wherein certain of the components are slightly enhanced for clarity.

Reducing Parallax Artifacts on Display Devices Including Multiple Display Screens As described above, FIG. 1A illustrates EGM 10, which includes housing 12 that houses display device 14 and touch screen 16. It should be appreciated that in other embodiments the EGM does not include a touch screen. Display device 14 includes first, front, or exterior display screen 18a and second, rear, or interior display screen 18b. Exterior display screen 18a and interior display screen 18b each include a display surface. EGM 10 includes a processor (not shown) configured to operate with exterior display screen 18a and interior display screen 18b to display one or more images on the display screens of exterior display screen 18a and interior display screen 18b. Exterior display screen 18a and interior display screen 18b are mounted and oriented within housing 12 such that at least one line of sight of a player, such as line of sight 20 extending from viewpoint 11 of the player, intersects both the display surface of exterior display screen 18a and the display surface of interior display screen 18b. In this illustrated embodiment, exterior display screen 18a and interior display screen 18b are aligned such that a plurality of lines of sight intersect both the display surface of exterior display screen 18a and the display surface of interior display screen 18b. Display device 14 also includes a back lighting source 19 positioned behind and aligned with exterior display screen 18a and interior display screen 18b, though it should be appreciated that in other embodiments the EGM does not include a back lighting source.

As shown in FIG. 1A, exterior display screen 18a and interior display screen 18b are separated by a predetermined distance dbl, which is the distance from the display surface of exterior display screen 18a to the display surface of interior display screen 18b along a line perpendicular to the display surfaces of exterior display screen 18a and interior display screen 18b. Predetermined distance dbl may be any suitable distance desired by the manufacturer of the EGM. In one embodiment, the exterior display screen and the interior display screen are positioned adjacent to one another such that only the thickness of the display screens separates the display surfaces of those display screens. In this embodiment, the predetermined distance dbl depends on the thickness of the display screens.

In various embodiments, such as the embodiment illustrated in FIG. 1A, the exterior display screen and the interior display screen are positioned in different, parallel planes. It should be appreciated, however, that the exterior display screen and the interior display screen may be positioned in planes that are not parallel to one another. In certain embodiments, such as the embodiment illustrated in FIG. 1A, the exterior display screen and the interior display screen are of the same or substantially the same size, though it should be appreciated that, in other embodiments, the interior and exterior display screens are of different sizes. In various embodiments, such as the embodiment illustrated in FIG. 1A, the exterior display screen and the interior display screen are substantially flat, though it should be appreciated that the exterior display screen and the interior display screen may have any suitable shape, such as a concave shape, a convex shape, or another non-uniform shape.

In various embodiments, the exterior display screen is translucent or transparent, or alternatively has the capacity to become translucent or transparent under the control of the processor. In certain embodiments, the interior display screen is translucent or transparent, or alternatively has the capacity to become translucent or transparent under the control of the processor. In embodiments in which the exterior display screen is transparent or translucent, a player can view any images displayed on the interior display screen by looking through the transparent exterior display screen.

In various embodiments, the display device is configured to display an image in three dimensions by displaying that image on each of the display screens such that, for each portion of the image: (a) that portion of the image is displayed on the exterior display screen at a distance from the first reference plane and a distance from the second reference plane, and (b) that same portion of the image is displayed on the interior display screen at that same distance from the first reference plane and that same distance from the second reference plane. The corresponding images displayed on the display screens co-act to display a resultant image that has three actual dimensions based on the predetermined distance dbl between the display surfaces of the exterior display screen and the interior display screen.

FIGS. 3A, 3B, and 3C illustrate an example of one such embodiment of an EGM. More specifically, FIG. 3A illustrates a front view of interior display screen 118b of this example EGM, FIG. 3B illustrates a front view of exterior display screen 118a of this example EGM, and FIG. 3C illustrates a front view of display device 114 (which includes exterior display screen 118a and interior display screen 118b) of this example EGM. As shown in FIGS. 3A, 3B, and 3C, exterior display screen 118a and interior display screen 118b co-act to display a resultant three-dimensional image 124 on display device 114. Resultant three-dimensional image 124 is a slot machine reel including a reel outline 121 and a plurality of symbols 123. To display resultant three-dimensional image 124, interior display screen 118b displays reel outline 121 and symbols 123 (as shown in FIG. 3A). Exterior display screen 118a displays symbols 123 (as shown in FIG. 3B) such that, for each portion of each of the symbols: (a) that portion of that symbol is displayed on exterior display screen 118a at a same distance from first reference plane 700 as that portion of that symbol displayed on interior display screen 118b, and (b) that portion of that symbol is displayed on exterior display screen 118a at a same distance from second reference plane 800 as that portion of that symbol displayed on interior display screen 118b. As a result, display device 114 displays resultant three-dimensional image 124, as illustrated in FIG. 3C. Since both exterior display screen 118a and interior display screen 118b both display symbols 123 in the manner described above, symbols 123 of resultant three-dimensional image 124 are formed in three actual dimensions. The depth of symbols 123 is equal to (or otherwise based in part on or derived from) the predetermined distance dbl that separates the display surface of exterior display screen 118a and the display surface of interior display screen 118b.

While the predetermined distance dbl that separates the display surface of exterior display screen 118a and the display surface of interior display screen 118b provides depth such that the three-dimensional image appears, from a player's point of view, to be three-dimensional, it also causes parallax artifacts to appear to the player. These parallax artifacts cause the resultant three-dimensional image to appear distorted from the player's point of view. It should be appreciated that such parallax artifacts are not shown in FIG. 3C for clarity. More specifically, because the corresponding images displayed on the exterior and the interior display screens are displayed on the exterior and the interior display screens at the same distance from the first reference plane and the same distance from the second reference plane, certain of the corresponding portions of the images displayed on the exterior and the interior display screens do not line up with one another along a same line of sight of the player.

Figure 4A:
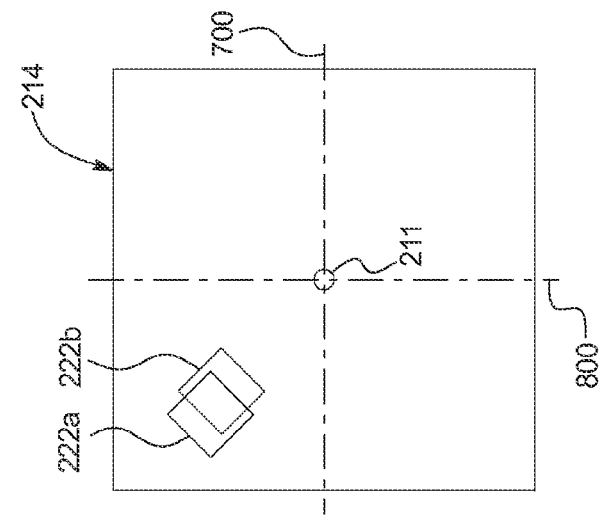
FIG. 4A illustrates a front view of the interior display screen of an example of another embodiment of an EGM, and illustrates the interior display screen displaying an image of a diamond.
Figure 4B:
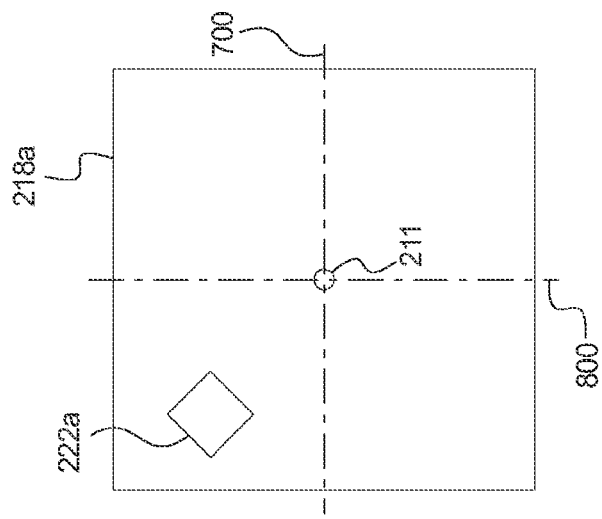
FIG. 4B illustrates a front view of the exterior display screen of the EGM of FIG. 4A, and illustrates the exterior display screen displaying an image of a diamond.
Figure 4C:
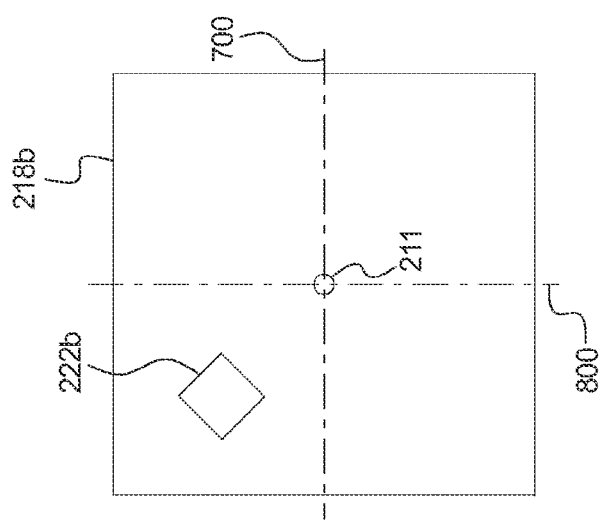
FIG. 4C illustrates a front view of the display device of the EGM of FIGS. 4A and 4B, and illustrates the display device displaying a resultant three-dimensional image of a diamond that includes parallax artifacts, wherein the parallax effect is slightly enhanced for clarity.

FIGS. 4A, 4B, 4C, 4D, and 4E illustrate an example of another embodiment of an EGM in which parallax artifacts appear when a same image is displayed on an exterior display screen and an interior display screen at a same distance from the first reference plane and a same distance from the second reference plane. More specifically, FIG. 4A illustrates a front view of interior display screen 218b of this example EGM as viewed from a viewpoint 211 of a player, FIG. 4B illustrates a front view of exterior display screen 218a of this example EGM as viewed from viewpoint 211 of the player, and FIG. 4C illustrates a front view of display device 214 (which includes exterior display screen 218a and interior display screen 218b) of this example EGM as viewed from viewpoint 211 of the player. As shown in FIGS. 4A, 4B, and 4C, exterior display screen 218a and interior display screen 218b co-act to display a resultant three-dimensional image 222 on display device 214. Resultant three-dimensional image 222 is an outline of a diamond.

To provide resultant image 222 in three dimensions, interior display screen 218b displays image 222b (i.e., the diamond, as shown in FIG. 4A) and exterior display screen 218a displays image 222a (i.e., the diamond, as shown in FIG. 4B) at a same distance from first reference plane 700 and a same distance from second reference plane 800. For example, the bottom point of image 222a is displayed on exterior display screen 218a at a first distance from first reference plane 700 and a second distance from second reference plane 800. Accordingly, in this example, the corresponding bottom point of image 222b is displayed on interior display screen 218b at the first distance from first reference plane 700 and the second distance from second reference plane 800.

As a result, display device 214 displays resultant three-dimensional image 222 (i.e., the diamond), as illustrated in FIG. 4C. Since both exterior display screen 218a and interior display screen 218b display the same image of the diamond, resultant three-dimensional image 222 is formed in three actual dimensions. The depth of resultant three-dimensional image 222 is equal to (or otherwise based on or derived from) the predetermined distance dbl that separates the display surface of exterior display screen 218a and the display surface of interior display screen 218b. However, as viewed from viewpoint 211 of the player, which in this example is located at the intersection of the first reference plane and the second reference plane a certain distance from the exterior display screen, the combination of: (a) the predetermined distance dbl that separates the display surface of exterior display screen 218a and the display surface of interior display screen 218b; and (b) the fact that, in this example, images 222a and 222b are displayed at a same distance from first reference plane 700 and a same distance from second reference plane 800 causes vertical and horizontal parallax artifacts in resultant image 222 that, from the player's point of view, distorts resultant three-dimensional image 222. More specifically, as shown in FIG. 4C, as viewed from viewpoint 211 of the player, each portion of image 222b displayed on interior display screen 218b appears to be closer first reference plane 700 and second reference plane 800 than the corresponding portion of image 218a displayed on exterior display screen 218a. Accordingly, from viewpoint 211 of the player, the images 222a and 222b do not co-act to form a cohesive resultant three-dimensional image. Rather, the parallax artifacts cause the images 222a and 222b to co-act to form a distorted resultant three dimensional image 222. It should be appreciated that the parallax effect in FIG. 4C is slightly enhanced for clarity.

Figure 4D:
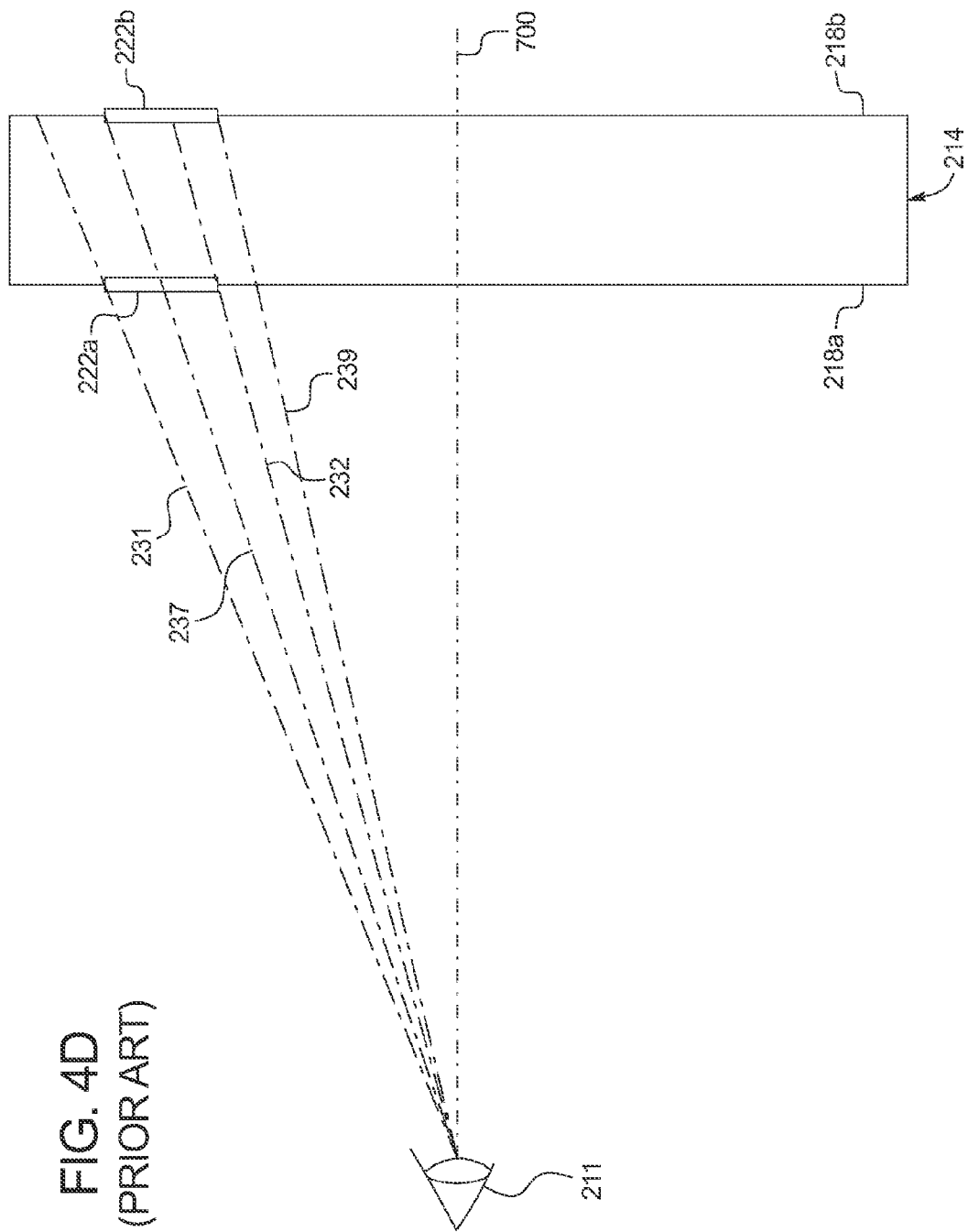
FIG. 4D illustrates a side diagrammic view of the display device of the EGM of FIGS. 4A, 4B, and 4C, and illustrates a plurality of lines of sight extending from a viewpoint of a player to the image displayed on the exterior and interior display screens, wherein certain of the components are slightly enhanced for clarity.

FIG. 4D more specifically illustrates the vertical component of these parallax artifacts. FIG. 4D illustrates a side diagrammic view of display device 214 in which exterior display screen 218a displays image 222a and interior display screen 218b displays image 222b. It should be appreciated that certain of the components of FIG. 4D are slightly enhanced for clarity. As explained above, it should be appreciated from FIG. 4D that the corresponding portions of images 222a and 222b are displayed on exterior display screen 218a and interior display screen 218b, respectively, a same distance from first reference plane 700.

Line of sight 232 extends from viewpoint 211 of the player and intersects the bottommost point of image 222a displayed on exterior display screen 218a (i.e., the bottommost point of the diamond displayed on exterior display screen 218a in this example). Line of sight 232 does not, however, intersect the bottommost point of image 222b displayed on interior display screen 218b (i.e., the bottommost point of the diamond displayed on interior display screen 218b in this example). Instead, line of sight 239 extends from viewpoint 211 of the player and intersects the bottommost point of image 222b displayed on interior display screen 218b. That is, the bottommost point of image 222a displayed on exterior display screen 218a falls on a different line of sight than the bottommost point of image 222b displayed on interior display screen 218b. Accordingly, in this example (and as illustrated in FIG. 4C), the player views the bottommost points of both image 222a displayed on exterior display screen 218a and image 222b displayed on interior display screen 218b. This vertical component of the parallax artifacts results in the player viewing a distorted resultant three-dimensional image rather than a cohesive resultant three-dimensional image.

Similarly, line of sight 231 extends from viewpoint 211 of the player and intersects the topmost point of image 222a displayed on exterior display screen 218a (i.e., the topmost point of the diamond displayed on exterior display screen 218a in this example). Line of sight 231 does not, however, intersect the topmost point of image 222b displayed on interior display screen 218b (i.e., the topmost point of the diamond displayed on interior display screen 218b in this example). Instead, line of sight 237 extends from viewpoint 211 of the player and intersects the topmost point of image 222b displayed on interior display screen 218b. That is, the topmost point of image 222a displayed on exterior display screen 218a falls on a different line of sight than the topmost point of image 222b displayed on interior display screen 218a. Accordingly, in this example (and as illustrated in FIG. 4C), the player views the topmost points of both image 222a displayed on exterior display screen 218a and image 222b displayed on interior display screen 218b. This vertical component of the parallax artifacts results in the player viewing a distorted resultant three-dimensional image rather than a cohesive resultant three-dimensional image.

FIG. 4E more specifically illustrates the horizontal component of these parallax artifacts. FIG. 4E illustrates a top diagrammic view of display device 214 in which exterior display screen 218a displays image 222a and interior display screen 218b displays image 222b. It should be appreciated that certain of the components of FIG. 4E are slightly enhanced for clarity. It should be appreciated from FIG. 4E that the corresponding portions of images 222a and 222b are displayed on exterior display screen 218a and interior display screen 218b, respectively, a same distance from second reference plane 800.

Line of sight 242 extends from viewpoint 211 of the player and intersects the rightmost point of image 222*a* displayed on exterior display screen 218*a* (i.e., the rightmost point of the diamond displayed on exterior display screen 218*a* in this example). Line of sight 242 does not, however, intersect the rightmost point of image 222*b* displayed on interior display screen 218*b* (i.e., the rightmost point of the diamond displayed on interior display screen 218*b* in this example). Instead, line of sight 249 extends from viewpoint 211 of the player and intersects the rightmost point of image 222*b* displayed on interior display screen 218*b*. That is, the rightmost point of image 222*a* displayed on exterior display screen 218*a* falls on a different line of sight than the rightmost point of image 222*b* displayed on interior display screen 218*b*. Accordingly, in this example (and as illustrated in FIG. 4C), the player views the rightmost points of both image 222*a* displayed on exterior display screen 218*a* and image 222*b* displayed on interior display screen 218*b*. This horizontal component of the parallax artifacts results in the player viewing a distorted resultant three-dimensional image rather than a cohesive resultant three-dimensional image.

Similarly, line of sight 241 extends from viewpoint 211 of the player and intersects the leftmost point of image 222*a* displayed on exterior display screen 218*a* (i.e., the leftmost point of the diamond displayed on exterior display screen 218*a* in this example). Line of sight 241 does not, however, intersect the leftmost point of image 222*b* displayed on interior display screen 218*b* (i.e., the leftmost point of the diamond displayed on interior display screen 218*b* in this example). Instead, line of sight 247 extends from viewpoint 211 of the player and intersects the leftmost point of image 222*b* displayed on interior display screen 218*b*. That is, the leftmost point of image 222*a* displayed on exterior display screen 218*a* falls on a different line of sight than the leftmost point of image 222*b* displayed on interior display screen 218*a*. Accordingly, in this example (and as illustrated in FIG. 4C), the player views the leftmost points of both image 222*a* displayed on exterior display screen 218*a* and image 222*b* displayed on interior display screen 218*b*. This horizontal component of the parallax artifacts results in the player viewing a distorted resultant three-dimensional image rather than a cohesive resultant three-dimensional image.

In general, to reduce or eliminate the appearance of these parallax artifacts, in one embodiment of the present disclosure the processor of the gaming system determines, for a first portion of an image to be displayed on the exterior display screen: (a) a distance from the first reference plane, and (b) a distance from the second reference plane at which to display the first portion of the image on the exterior display screen. The processor determines, for that same first portion of that same image to be displayed on the interior display screen: (a) a distance from the first reference plane, and (b) a distance from the second reference plane at which to display the first portion of the image on the interior display screen such that the appearance of parallax artifacts associated with the first portion of the image is reduced or eliminated (i.e., such that the corresponding first portions of the images displayed on the exterior and interior display screens fall on a same line of sight of the player). In this embodiment, the processor makes the latter determination based on: (a) the determined distance from the first reference plane at which the first portion of the image is to be displayed on the exterior display screen, (b) the determined distance from the second reference plane at which the first portion of the image is to be displayed on the exterior display screen, (c) a distance separating the player from the exterior display screen, and (d) the predetermined distance dbl separating the display surface of the exterior display screen and the display surface of the interior display screen.

In another embodiment of the present disclosure, to reduce or eliminate the appearance of these parallax artifacts, the processor of the gaming system determines, for a first portion of an image to be displayed on the interior display screen: (a) a distance from the first reference plane, and (b) a distance from the second reference plane at which to display the first portion of the image on the interior display screen. The processor determines, for that same first portion of that same image to be displayed on the exterior display screen: (a) a distance from the first reference plane, and (b) a distance from the second reference plane at which to display the first portion of the image on the exterior display screen such that the appearance of parallax artifacts associated with the first portion of the image is reduced or eliminated (i.e., such that the corresponding first portions of the images displayed on the exterior and interior display screens fall on a same line of sight of the player). In this embodiment, the processor makes the latter determination based on: (a) the determined distance from the first reference plane at which the first portion of the image is to be displayed on the interior display screen, (b) the determined distance from the second reference plane at which the first portion of the image is to be displayed on the interior display screen, (c) a distance separating the player from the exterior display screen, and (d) the predetermined distance dbl separating the display surface of the exterior display screen and the display surface of the interior display screen.

More specifically, in one embodiment of the present disclosure, to reduce or eliminate the vertical component of these parallax artifacts, for a given point on the exterior display screen at which a portion of an image is to be displayed, the processor of the gaming system uses: (a) a location of a viewpoint of a player (which defines the first and second reference planes, as explained above), (b) a distance separating the viewpoint of the player from the exterior display screen, (c) the predetermined distance dbl separating the display surface of the exterior display screen and the display surface of the interior display screen, and (d) the distance from the first reference plane to that point on the exterior display screen to determine the distance from the first reference plane to the corresponding point on the interior display screen at which that same portion of the image will be displayed such that the corresponding portions of the image fall on a same vertical line of sight of the player. That is, in this embodiment, the processor determines the distance from the first reference plane at which to display a portion of an image on the interior display screen such that the vertical component of the parallax artifacts caused by that portion of the image is reduced or eliminated, wherein that distance from the first reference plane is based on the distance from the first reference plane at which that portion of that image is to be displayed on the exterior display screen.

In another embodiment of the present disclosure, to reduce or eliminate the vertical component of these parallax artifacts, for a given point on the interior display screen at which a portion of an image is to be displayed, the processor of the gaming system uses: (a) a location of a viewpoint of a player (which defines the first and second reference planes, as explained above), (b) a distance separating the viewpoint of the player from the exterior display screen, (c) the predetermined distance dbl separating the display surface of the exterior display screen and the display surface of the interior display screen, and (d) the distance from the first reference plane to that point on the interior display screen to determine the distance from the first reference plane to the corresponding point on the exterior display screen at which that same portion of the image will be displayed such that the corresponding portions of the image fall on a same vertical line of sight of the player. That is, in this embodiment, the processor determines the distance from the first reference plane at which to display a portion of an image on the exterior display screen such that the vertical component of the parallax artifacts caused by that portion of the image is reduced or eliminated, wherein that distance from the first reference plane is based on the distance from the first reference plane at which that portion of that image is to be displayed on the interior display screen.

Figure 5A:
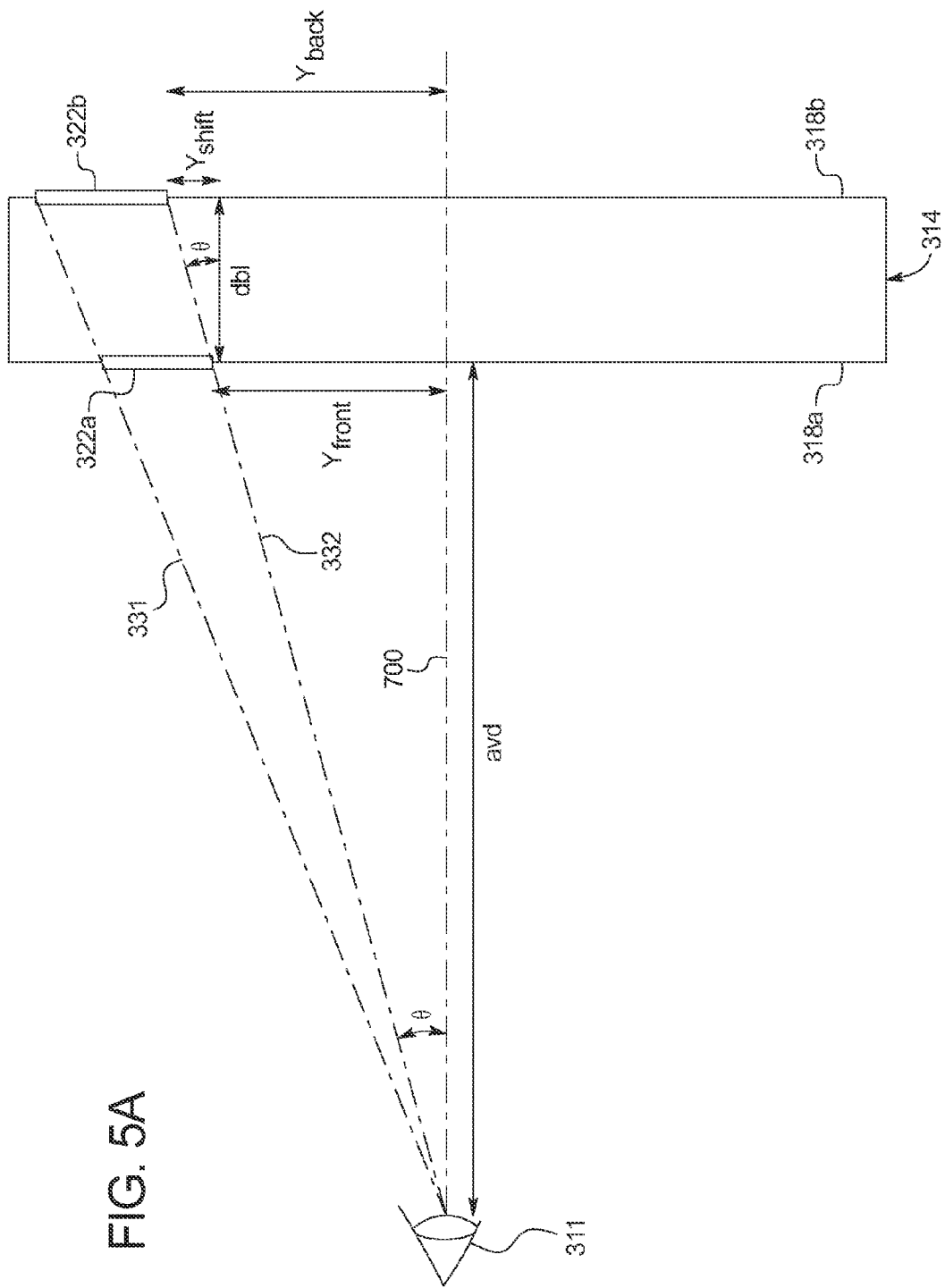
FIG. 5A illustrates a side diagrammic view of the display device of an example of one embodiment of the gaming system of the present disclosure, and illustrates a plurality of lines of sight extending from a viewpoint of a player to an image displayed on the exterior display screen of the display device and an image displayed on the interior display screen of the display device, wherein certain of the components are slightly enhanced for clarity.

The processor makes such determinations using one or more vertical parallax correction equations derived from FIG. 5A. FIG. 5A illustrates a side diagrammic view of display device 314 of an example of an embodiment of the gaming system of the present disclosure. Exterior display screen 318a of display device 314 displays image 322a and interior display screen 318b of display device 314 displays image 322b such that the vertical component of the parallax artifacts is eliminated. In other words, exterior display screen 318a displays image 322a and interior display screen 318b displays image 322b such that the corresponding portions of images 322a and 322b fall on the same lines of sight of the player, thereby eliminating the vertical component of the parallax artifacts. It should be appreciated that certain of the components of FIG. 5A are slightly enhanced for clarity.

The vertical parallax correction equations use the following variables shown in FIG. 5A: θ, which is the angle formed between line of sight 332 and first reference plane 700; avd which is the distance separating the player from exterior display screen 318a (i.e., the distance separating viewpoint 311 of the player from exterior display screen 318a along first reference plane 700); $Y_{front}$, which is the distance separating the bottommost point of image 322a displayed on exterior display screen 318a from first reference plane 700; dbl which is the distance separating the display surfaces of exterior display screen 318a and interior display screen 318b; $Y_{shift}$, which is the distance, relative to first reference plane 700, separating the bottommost point of image 322a from the bottommost point of image 322b (i.e., the distance separating the bottommost point of image 322a from first reference plane 700 subtracted from the distance separating the bottommost point of image 322b from first reference plane 700); and $Y_{back}$, which is the distance separating the bottommost point of image 322b displayed on interior display screen 318b from first reference plane 700. It should be appreciated from the above variables that the vertical parallax correction equations are derived using the (corresponding) bottommost points of images 322a and 322b, though any suitable corresponding points may be used.

As shown in Equation 1 below, the tangent of an angle (such as an angle α) formed between two sides of a right triangle is equal to the length of the side opposite that angle divided by the length of the side adjacent to that angle.

$$\tan\alpha = \frac{opposite}{adjacent} \quad (1)$$

Applying Equation 1 to the angle θ of FIG. 5A of the right triangle formed by line of sight 332, $Y_{front}$, and avd results in Equation 2 below.

$$\tan\theta = \frac{Y_{front}}{avd} \quad (2)$$

Similarly, applying Equation 1 to the angle θ of FIG. 5A of the right triangle formed by line of sight 332, $Y_{shift}$, and dbl results in Equation 3 below.

$$\tan\theta = \frac{Y_{shift}}{dbl} \quad (3)$$

Similarly, applying Equation 1 to the angle θ of FIG. 5A of the right triangle formed by line of sight 332, $Y_{back}$, and avd+dbl results in Equation 4 below.

$$\tan\theta = \frac{Y_{back}}{avd + dbl} \quad (4)$$

As illustrated in FIG. 5A, and as shown in Equation 5 below, $Y_{back} = Y_{front} + Y_{shift}$.

$$Y_{back} = Y_{front} + Y_{shift} \quad (5)$$

Combining Equations 4 and 5 results in Equation 6 below.

$$\tan\theta = \frac{Y_{front} + Y_{shift}}{avd + dbl} \quad (6)$$

Combining Equations 2, 3, 4, and 6 result in Equation 7 below.

$$\frac{Y_{front}}{avd} = \frac{Y_{shift}}{dbl} = \frac{Y_{back}}{avd + dbl} = \frac{Y_{front} + Y_{shift}}{avd + dbl} \quad (7)$$

Equation 7 is used to determine $Y_{shift}$ in terms of dbl, avd, and $Y_{front}$, as shown in Equation 8 below, or in terms of dbl, avd, and $Y_{back}$, as shown in Equation 9 below.

$$Y_{shift} = \frac{(Y_{front})(dbl)}{avd} \quad (8)$$

$$Y_{shift} = \frac{(Y_{back})(dbl)}{(avd + dbl)} \quad (9)$$

Once $Y_{front}$, $Y_{back}$, and $Y_{shift}$ are known for a given set of corresponding image portions, $Y_{scale}$ can be determined, as shown in Equation 10 below.

$$Y_{scale} = \frac{Y_{back}}{Y_{front}} = \frac{Y_{front} + Y_{shift}}{Y_{front}} = \frac{Y_{back}}{Y_{back} - Y_{shift}} \quad (10)$$

$Y_{scale}$ is a scale factor that, when multiplied by $Y_{front}$, provides the corresponding $Y_{back}$. Thus, once $Y_{scale}$ is determined for a given dbl and avd, the processor may determine $Y_{back}$ for a given $Y_{front}$ by multiplying $Y_{front}$ by $Y_{scale}$ or may determine $Y_{front}$ for a given $Y_{back}$ by dividing $Y_{back}$ by $Y_{scale}$.

It should thus be appreciated that, in one embodiment, once the processor determines the distance from the first reference plane at which to display a portion of an image on the exterior display screen, the processor uses the above equations to determine the corresponding distance from the first reference plane at which to display the corresponding portion of the image on the interior display screen such that the vertical component of the parallax artifacts are eliminated. In another embodiment, the processor makes such a determination by employing a lookup table rather than determining the corresponding distance using the equations (as further described below). Similarly, it should be appreciated that, in another embodiment, once the processor determines the distance from the first reference plane at which to display a portion of an image on the interior display screen, the processor uses the above equations to determine the corresponding distance from the first reference plane at which to display the corresponding portion of the image on the exterior display screen such that the vertical component of the parallax artifacts are eliminated. In another embodiment, the processor makes such a determination by employing a lookup table rather than determining the corresponding distance using the equations (as further described below).

Similarly, in one embodiment of the present disclosure, to reduce or eliminate the horizontal component of these parallax artifacts, for a given point on the exterior display screen at which a portion of an image is to be displayed, the processor of the gaming system uses: (a) a location of a viewpoint of a player (which defines the first and second reference planes, as explained above), (b) a distance separating the viewpoint of the player from the exterior display screen, (c) the predetermined distance dbl separating the display surface of the exterior display screen and the display surface of the interior display screen, and (d) the distance from the second reference plane to that point on the exterior display screen to determine the distance from the second reference plane to the corresponding point on the interior display screen at which that same portion of the image will be displayed such that the corresponding portions of the image fall on a same horizontal line of sight of the player. That is, in this embodiment, the processor determines the distance from the second reference plane at which to display a portion of an image on the interior display screen such that the horizontal component of the parallax artifacts caused by that portion of the image is reduced or eliminated, wherein that distance from the second reference plane is based on the distance from the second reference plane at which that portion of that image is to be displayed on the exterior display screen.

In another embodiment of the present disclosure, to reduce or eliminate the horizontal component of these parallax artifacts, for a given point on the interior display screen at which a portion of an image is to be displayed, the processor of the gaming system uses: (a) a location of a viewpoint of a player (which defines the first and second reference planes, as explained above), (b) a distance separating the viewpoint of the player from the exterior display screen, (c) the predetermined distance dbl separating the display surface of the exterior display screen and the display surface of the interior display screen, and (d) the distance from the second reference plane to that point on the interior display screen to determine the distance from the second reference plane to the corresponding point on the exterior display screen at which that same portion of the image will be displayed such that the corresponding portions of the image fall on a same vertical line of sight of the player. That is, in this embodiment, the processor determines the distance from the second reference plane at which to display a portion of an image on the exterior display screen such that the horizontal component of the parallax artifacts caused by that portion of the image is reduced or eliminated, wherein that distance from the second reference plane is based on the distance from the second plane at which that portion of that image is to be displayed on the interior display screen.

Figure 5B:
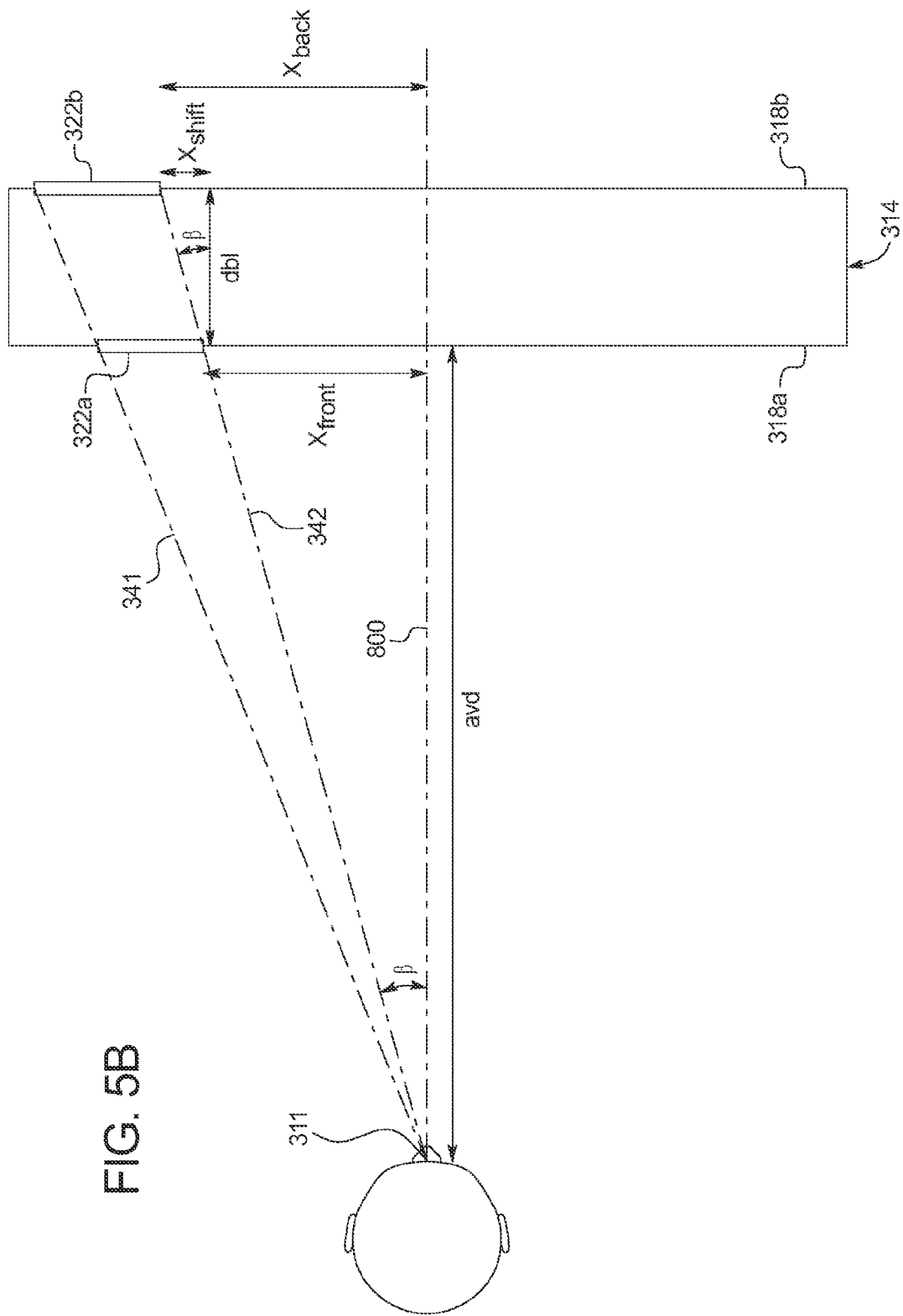
FIG. 5B illustrates a top diagrammic view of the display device of the gaming system FIG. 5B, and illustrates a plurality of lines of sight extending from a viewpoint of a player to the image displayed on the exterior display screen of the display device and the image displayed on the interior display screen of the display device, wherein certain of the components are slightly enhanced for clarity.

The processor makes such determinations using one or more horizontal parallax correction equations derived from FIG. 5B. FIG. 5B illustrates a top diagrammatic view of display device 314 in which exterior display screen 318a displays image 322a and interior display screen 318b displays image 322b such that the horizontal component of the parallax artifacts is eliminated. In other words, exterior display screen 318a displays image 322a and interior display screen 318b displays image 322b such that the corresponding portions of images 322a and 322b fall on the same horizontal lines of sight of the player, thereby eliminating the horizontal component of the parallax artifacts. It should be appreciated that certain of the components of FIG. 5B are slightly enhanced for clarity.

The horizontal parallax correction equations use the following variables shown in FIG. 5B: β, which is the angle formed between line of sight 342 and second reference plane 800; avd, which is the distance separating the player from exterior display screen 318a (i.e., the distance separating viewpoint 311 of the player from exterior display screen 318a along second reference plane 800); $X_{front}$, which is the distance separating the rightmost point of image 322a displayed on exterior display screen 318a from second reference plane 800; dbl which is the distance separating the display surfaces of exterior display screen 318a and interior display screen 318b; $X_{shift}$, which is the distance, relative to second reference plane 800, separating the rightmost point of image 322a from the rightmost point of image 322b (i.e., the distance separating the rightmost point of image 322a from second reference plane 800 subtracted from the distance separating the rightmost point of image 322b from second reference plane 800); and $X_{back}$, which is the distance separating the rightmost point of image 322b displayed on interior display screen 318b from second reference plane 800. It should be appreciated from the above variables that the horizontal parallax correction equations are derived using the (corresponding) rightmost points of images 322a and 322b, though any suitable corresponding points may be used.

It should be appreciated that the equations listed below are derived under the assumption that any horizontal component of the parallax artifacts caused by the distance between a player's eyes is negligible.

As shown in Equation 11 below, the tangent of an angle (such as an angle α) formed between two sides of a right triangle is equal to the length of the side opposite that angle divided by the length of the side adjacent to that angle.

$$\tan\alpha = \frac{\text{opposite}}{\text{adjacent}} \quad (11)$$

Applying Equation 11 to the angle β of FIG. 5B of the right triangle formed by line of sight 342, $X_{front}$, and avd results in Equation 12 below.

$$\tan\beta = \frac{X_{front}}{avd} \quad (12)$$

Similarly, applying Equation 11 to the angle β of FIG. 5B of the right triangle formed by line of sight 342, $X_{shift}$, and dbl results in Equation 13 below.

$$\tan\beta = \frac{X_{shift}}{dbl} \quad (13)$$

Similarly, applying Equation 11 to the angle β of FIG. 5B of the right triangle formed by line of sight 342, $X_{back}$ and avd+dbl results in Equation 14 below.

$$\tan\beta = \frac{X_{back}}{avd + dbl} \quad (14)$$

As illustrated in FIG. 5B, and as shown in Equation 15 below, $X_{back} = X_{front} + X_{shift}$.

$$X_{back} = X_{front} + X_{shift} \quad (15)$$

Combining Equations 14 and 15 results in Equation 16 below.

$$\tan\beta = \frac{X_{front} + X_{shift}}{avd + dbl} \quad (16)$$

Combining Equations 12, 13, 14, and 16 result in Equation 17 below.

$$\frac{X_{front}}{avd} = \frac{X_{shift}}{dbl} = \frac{X_{back}}{avd + dbl} = \frac{X_{front} + X_{shift}}{avd + dbl} \quad (17)$$

Equation 17 is used to determine $X_{shift}$ in terms of dbl, avd, and $X_{front}$, as shown in Equation 18 below, or in terms of dbl, avd, and $X_{back}$, as shown in Equation 19 below. Equations 18 and 19 are the horizontal parallax correction equations $$X_{shift} = \frac{(X_{front})(dbl)}{avd} \quad (18)$$

$$X_{shift} = \frac{(X_{back})(dbl)}{(avd + dbl)} \quad (19)$$

Once $X_{front}$, $X_{back}$, and $X_{shift}$ are known for a given set of corresponding image portions, $X_{scale}$ can be determined, as shown in Equation 20 below.

$$X_{scale} = \frac{X_{back}}{X_{front}} = \frac{X_{front} + X_{shift}}{X_{front}} = \frac{X_{back}}{X_{back} - X_{shift}} \quad (20)$$

$X_{scale}$ is a scale factor that, when multiplied by $X_{front}$, provides the corresponding $X_{back}$. Thus, once $X_{scale}$ is determined for a given dbl and avd, the processor may determine $X_{back}$ for a given $X_{front}$ by multiplying $X_{front}$ by $X_{scale}$ or may determine $X_{front}$ for a given $X_{back}$ by dividing $X_{back}$ by $X_{scale}$.

It should thus be appreciated that, in one embodiment, once the processor determines the distance from the second reference plane at which to display a portion of an image on the exterior display screen, the processor uses the above equations to determine the corresponding distance from the second reference plane at which to display the corresponding portion of the image on the interior display screen such that the horizontal component of the parallax artifacts are eliminated. In another embodiment, the processor makes such a determination by employing a lookup table rather than determining the corresponding distance using the equations (as further described below). Similarly, it should be appreciated that, in another embodiment, once the processor determines the distance from the second reference plane at which to display a portion of an image on the interior display screen, the processor uses the above equations to determine the corresponding distance from the second reference plane at which to display the corresponding portion of the image on the exterior display screen such that the horizontal component of the parallax artifacts are eliminated. In another embodiment, the processor makes such a determination by employing a lookup table rather than determining the corresponding distance using the equations (as further described below).

Figure 5C:
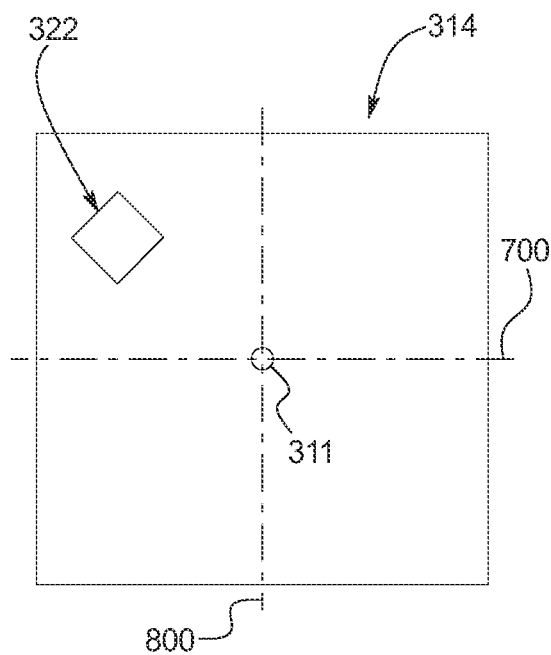
FIG. 5C illustrates a front view of the display device of the gaming system of FIGS. 5A and 5B, and illustrates the display device displaying a resultant three-dimensional image of a diamond without parallax artifacts.

FIG. 5C illustrates a front view of display device 314 displaying resultant three-dimensional image 322 without any parallax artifacts. That is, as shown in FIG. 30, no parallax artifacts appear to the player with respect to resultant three-dimensional image 322.

Since the locations of the image portions on the exterior and the interior display screens are determined with respect to static reference planes, it should be appreciated that the interior and the exterior display screens may be of different sizes and/or not fully aligned with one another.

It should further be appreciated that although the first and second reference planes employed in the above-described examples are horizontal and vertical reference planes, respectively, the first reference plane and the second reference plane may be any suitable reference planes oriented in any suitable manner.

In one example, the display device has a total viewable height of 11.6575 inches and a total viewable width of 18.724 inches. That is, the exterior display screen and the interior display screen each has a total viewable height of 11.6575 inches and a total viewable width of 18.724 inches. In this example, dbl is equal to 0.315 inches and avd is equal to 30 inches, meaning that the viewpoint of the player is located 30 inches from the exterior display screen. Additionally, in this example, the viewpoint of the player is located at the intersection of a first horizontal reference plane and a second vertical reference plane such that the viewpoint of the player is located at the horizontal and the vertical center of the display device. In this example, the processor determines $Y_{scale}$ and $X_{scale}$ by first determining the distance from the horizontal reference plane and the distance from the vertical reference plane of a portion of an image to be displayed on the interior display screen based on the location of the corresponding portion of that image to be displayed on the exterior display screen such that parallax artifacts are reduced or eliminated. That is, the processor determines where to display that portion of the image on the exterior display screen and determines where to display that portion of the image on the interior display screen such that the parallax artifacts are reduced or eliminated.

In this example, the processor determines to display a first portion of an image on the exterior display screen at a distance 5 inches to the left of the vertical reference plane and 5 inches from the horizontal reference plane. To determine the corresponding distances from the horizontal and the vertical reference planes at which the corresponding first portion of the image will be displayed on the interior display screen, the processor uses Equations 8 and 18. Using Equation 8, the processor determines that $Y_{shift}$ is equal to 0.0525 inches and that $X_{shift}$ is equal to −0.0525 inches. Using these values, the processor utilizes Equations 10 and 20 to determine $Y_{scale}$ and $X_{scale}$, which are each equal to 1.0105. The processor then uses these $Y_{scale}$ and $X_{scale}$ factors to determine, for each portion of the image to be displayed on the exterior display screen, the distance from the horizontal reference plane and the distance from the vertical reference plane at which to display the corresponding portion of the image on the interior display screen. For instance, the interior display screen will display the first portion of the image at 5.0525 inches to the left of the vertical reference plane and 5.0525 inches above the horizontal reference plane in this example. It should be appreciated from this example that the processor determines the distance from the horizontal reference plane and the distance from the vertical reference plane of an image to be displayed on the interior display screen based on the determined distance from the horizontal reference plane and the determined distance from the vertical reference plane at which that image is to be displayed on the exterior display screen.

In one embodiment, the gaming system determines $Y_{shift}$ and $X_{shift}$ for a given portion of an image to be displayed on the interior or the exterior display device and modifies the distance from the first reference plane and/or the distance from the second reference plane at which the portion of the image is to be displayed on the exterior display screen and the distance from the first reference plane and/or the distance from the second reference plane at which the portion of the image is to be displayed on the interior display screen based on $Y_{shift}$ and $X_{shift}$ to achieve the desired offset. That is, in this embodiment, the gaming system: (a) determines the actual distance from the first reference plane at which to display the portion of the image on the exterior display screen by adding a certain percentage (such as 50%) of $Y_{shift}$ to $Y_{front}$, and (b) determines the actual distance from the second reference plane at which to display the portion of the image on the interior display screen by adding a certain percentage (such as 50%) of $X_{shift}$ to $X_{front}$. Similarly, the gaming system (a) determines the actual distance from the first reference plane at which to display the portion of the image on the interior display screen image by subtracting the remaining percentage (such as 50%) of $Y_{shift}$ from $Y_{back}$, and (b) determines the actual distance from the second reference plane at which to display the portion of the image on the interior display screen by subtracting the remaining percentage (such as 50%) of $X_{shift}$ from $X_{back}$. For example, if the processor determines $Y_{shift}$ for a given portion of an image to be displayed 7 inches from the first reference plane on the exterior display screen to be 0.1 inches, the gaming system displays that portion of the image on the exterior display screen at 6.95 inches from the first reference plane on the exterior display screen and displays that corresponding portion of the image on the interior display screen at 7.05 inches from the first reference plane rather than displaying that corresponding portion of the image on the interior display screen at 7.10 inches from the first reference plane. In this example, the processor splits the difference between the exterior and the interior display screens, though any suitable percentage split may be employed. In another embodiment, the percentage split is 100% to 0%.

Since $Y_{front}$, $Y_{back}$, $Y_{shift}$, $X_{front}$, $X_{back}$, and $X_{shift}$ are each determined with respect to the first and second reference planes, which are based on the viewpoint of the player, it should be appreciated that the player's viewpoint and, therefore, the first and second reference planes, may be positioned at any suitable location relative to the display device. While the above derivations and the above example assume that the player's viewpoint is located at a certain location and the first and second reference points are oriented in a certain manner, the above Equations are modifiable such that they are applicable no matter where the player's viewpoint is located with respect to the display device and no matter the orientation of the first and second reference planes. Such modifications are performed by incorporating the $X_{scale}$ and $Y_{scale}$ factors into a transform matrix to take into account the different location of the player's viewpoint.

In certain embodiments, as generally described above, rather than determining $Y_{front}$, $Y_{back}$, $Y_{shift}$, $X_{front}$, $X_{back}$, and $X_{shift}$ to determine $Y_{scale}$ and $X_{scale}$, the gaming system stores or includes one or more lookup tables including the $Y_{scale}$ and $X_{scale}$ factors associated with certain combinations of dbl and avd (and, in some embodiments, screen size and/or location of the viewpoint of the player). In these embodiments, the gaming system looks up the correct $Y_{scale}$ and $X_{scale}$ factors for a given set of conditions and utilizes those scale factors to determine where to display the images on the display screens. In other embodiments, the lookup tables include, for certain combinations of dbl and avd, for each location on the exterior display screen and/or the interior display screen at which an image portion may be displayed, the corresponding location on the interior or exterior display screen at which a corresponding image portion will be displayed. In such embodiments, when the gaming system determines to display a portion of an image at a certain location on the exterior (or the interior) display screen, the gaming system looks up the location in the interior (or the exterior) display screen at which to display the corresponding portion of the image such that parallax artifacts are reduced or eliminated.

In certain embodiments, the gaming system includes a camera, sensor, or other device configured to track the location of and the movement of the player in relation to the gaming system. More particularly, the camera is configured to track the location of and the movement of the player's head in relation to the display device. This enables the gaming system to determine, at any given point in time: (a) the location of the player's viewpoint in relation to the display device and/or (b) the distance separating the player's viewpoint from the display device. Once the gaming system determines the location of the player's viewpoint in relation to the display device, the gaming system determines the first and second reference planes, which enables the gaming system to determine: (a) $Y_{front}$ and $X_{front}$ or (b) $Y_{back}$ and $X_{back}$ for a given point on the display device (i.e., corresponding points of the exterior and the interior display screens) to determine the applicable $Y_{scale}$ and $X_{scale}$ factors. The gaming system then uses the determined $Y_{scale}$ and $X_{scale}$ factors to determine the distances from the first and second reference planes at which corresponding images should be displayed on the exterior and interior display screens such that any parallax artifacts are reduced or eliminated. It should thus be appreciated that, in these embodiments, the gaming system actively determines the location of the player's viewpoint in relation to the display device and uses that determined location to determine where to display the images such that parallax artifacts are reduced or eliminated. Thus, as the player's head moves, the gaming system adjusts the displayed images accordingly such that parallax artifacts are continuously minimized or eliminated.

In one of these embodiments, rather than continuously measuring the location of the player's viewpoint in relation to the display device and continuously changing the locations of the images on the display screens to compensate for the changes in the location of the viewpoint of the player, the gaming system uses an average location of the viewpoint of the player to determine where to display the images on the display screens. For example, the gaming system may determine an average location of the viewpoint of the player over a one minute length of time, and use that average location of the viewpoint of the player to determine where to display the images on the display screens.

Figure 6A:
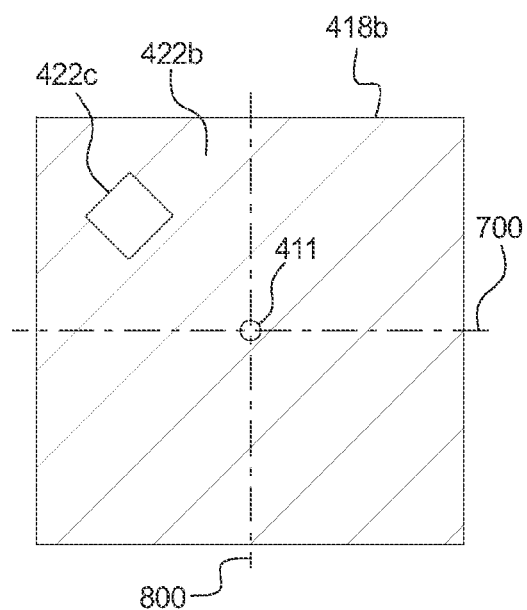
FIG. 6A illustrates a front view of the interior display screen of an example of another embodiment of an EGM, and illustrates the interior display screen displaying an image of a striped background having a transparent or substantially transparent section in the shape of a diamond.
Figure 6B:
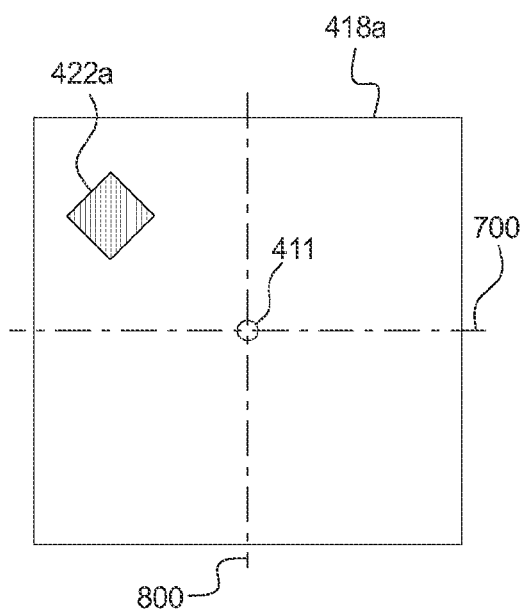
FIG. 6B illustrates a front view of the exterior display screen of the EGM of FIG. 6A, and illustrates the exterior display screen displaying an image of a diamond.
Figure 6C:
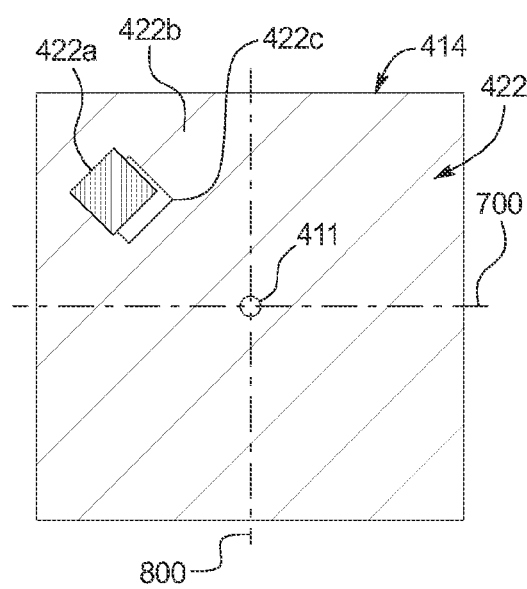
FIG. 6C illustrates a front view of the display device of the EGM of FIGS. 6A and 6B, and illustrates the display device displaying a resultant three-dimensional image of a diamond that includes parallax artifacts, wherein the parallax effect is slightly enhanced for clarity.
Figure 6D:
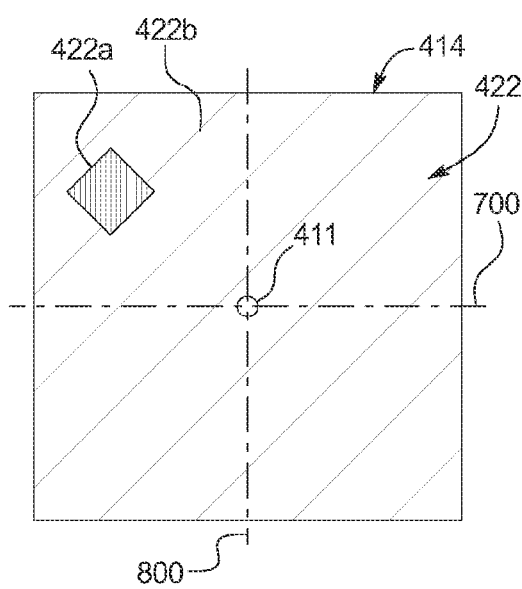
FIG. 6D illustrates a front view of the display device of an example of another embodiment of the gaming system of the present disclosure, and illustrates the display device displaying a resultant three-dimensional image of a diamond without parallax artifacts.

In addition to displaying three dimensional images by displaying a same image at the same distance from the first reference plane and the same distance from the second reference plane on the exterior and the interior display screens, in various embodiments, the display device is configured to display different images or information on the exterior and interior display screens that a player can view by looking at and through the exterior display screen. In one example illustrated in FIGS. 6A, 6B, 6C, and 6D, exterior display screen 418a and interior display screen 418b co-act to display a resultant three-dimensional image 422 on display device 414. Resultant three-dimensional image 422 includes a diamond 422a and a striped background 422b. To display resultant three-dimensional image 422, interior display screen 418b displays striped background 422b (as shown in FIG. 6A) and exterior display screen 418a displays diamond 422a (as shown in FIG. 6B). As a result, display device 414 displays resultant three-dimensional image 422, as illustrated in FIG. 6C. In this example, exterior display screen 418a is transparent or substantially transparent such that the player can view striped background 422b displayed on interior display screen 418b. Thus, diamond 422a appears closer to the player than striped background 422b. Further, in this example, for exterior display screen 418a to display diamond 422a, interior display screen 418b must let light through from a backlight (not shown) such that it impinges upon exterior display screen 418a. Here, this is accomplished by causing a section 422c of interior display screen 418b that corresponds to diamond 422a to be or become transparent or substantially transparent. From the above disclosure, it should be appreciated that, as shown in FIG. 6C, such a display causes parallax artifacts to appear. That is, from viewpoint 411 of the player, the player can see a portion of transparent or substantially transparent section 422c of interior display screen 418b. It should be appreciated that the parallax effect in FIG. 6C is slightly enhanced for clarity. Such parallax artifacts may be corrected in manners similar to those explained above, as shown in FIG. 6D, which illustrates an example of an embodiment of the gaming system of the present disclosure that eliminates the parallax artifacts shown in FIG. 6C.

Figure 7A:
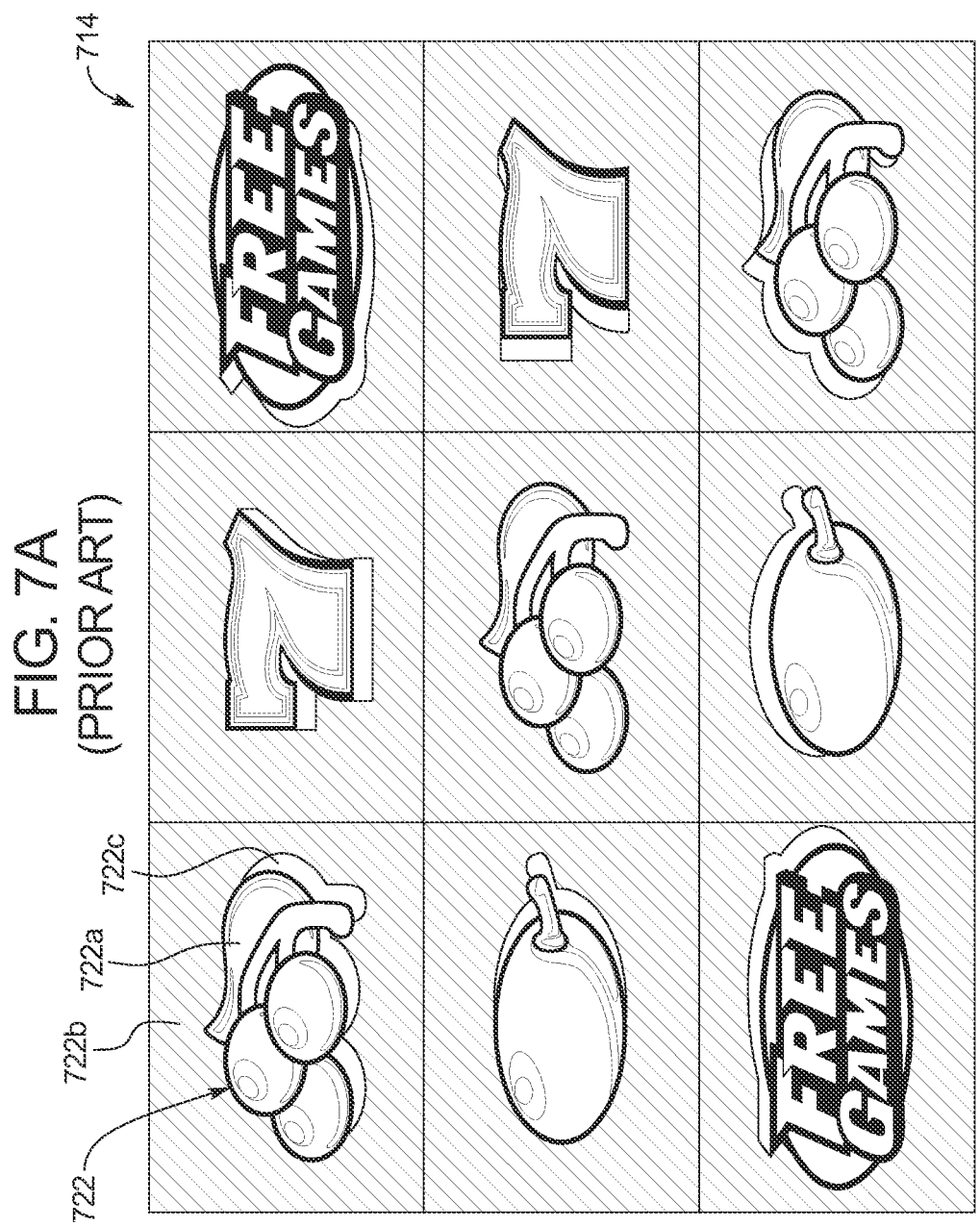
FIG. 7A illustrates a front view of the display device of an example of another embodiment of an EGM, and illustrates the display device displaying a resultant three dimensional image of a plurality of symbols that includes parallax artifacts, wherein the parallax effect is slightly enhanced for clarity.

Another such example is shown in FIGS. 7A and 7B. FIG. 7A illustrates a display device of an example of another embodiment of an EGM that displays a plurality of symbols without parallax correction; that is, parallax artifacts are visible. For example, the exterior display screen and the interior display screen co-act to display a resultant three-dimensional image 722 on display device 714. Resultant three-dimensional image 722 includes a triple cherry 722a and a striped background 722b. To display resultant three-dimensional image 722, the interior display screen displays striped background 722b and the exterior display screen displays triple cherry 722a. As a result, display device 714 displays resultant three-dimensional image 722. In this example, the exterior display screen is transparent or substantially transparent such that the player can view striped background 722b displayed on the interior display screen. Thus, triple cherry 722a appears closer to the player than striped background 722b. Further, in this example, for the exterior display screen to display triple cherry 722a, the interior display screen must let light through from a backlight (not shown) such that it impinges upon the exterior display screen. Here, this is accomplished by causing a section 722c of the interior display screen that corresponds to triple cherry 722a to be or become transparent or substantially transparent. From the above disclosure, it should be appreciated that such a display causes parallax artifacts to appear. That is, from the viewpoint of the player, the player can see a portion of transparent or substantially transparent section 722c of the interior display screen. It should be appreciated that the parallax effect in FIG. 7A is slightly enhanced for clarity. Such parallax artifacts may be corrected in manners similar to those explained above, as shown in FIG. 7B, which illustrates an example of an embodiment of the gaming system of the present disclosure that eliminates the parallax artifacts shown in FIG. 7A.

In certain embodiments, to project three-dimensional images having a 1:1 aspect ratio onto a two-dimensional screen (such as the exterior display screen and/or the interior display screen) having an aspect ratio that is not 1:1 (such as a 1.6:1 aspect ratio), the processor utilizes a virtual coordinate system and one or more scale factors to determine how the images should be displayed. In one embodiment, after determining $Y_{scale}$, the processor multiplies the determined $Y_{scale}$ by $Y_{vcm}$, which is the y-axis virtual coordinate maximum (e.g., 1.0 for a 1.6:1 aspect ratio display screen), and the determined $X_{scale}$ by $X_{vcm}$, which is the x-axis virtual coordinate maximum (e.g., 1.6 for a 1.6:1 aspect ratio display screen) and utilizes the modified scale factor to determine how to project a three-dimensional image while reducing or eliminating parallax artifacts.

While the above embodiments were generally described with respect to static images on the display screens, it should be appreciated that the present disclosure contemplates reducing or eliminating parallax artifacts with respect to moving content, such as movies, spinning reels, cards being dealt, and the like, being displayed on the display screens.

While the above embodiments were generally described with respect to a central or main display device, it should also be appreciated that the present disclosure contemplates reducing or eliminating parallax artifacts on any suitable display screens of the gaming system. For example, the gaming system reduces or eliminates parallax artifacts on the central or main display device; an upper or secondary display device (which includes a plurality of display screens); a player tracking display device (which includes a plurality of display screens); and/or a display device (which includes a plurality of display screens) that includes a touch screen and that acts as a button panel in place of, or in addition to, a standard button panel. Additionally, since each of these display devices is positioned at a different location with respect to the viewpoint of the player, gaming system will perform the parallax correction in a different manner for each of the display devices.

While the above examples and embodiments are discussed with respect to a display device including two display screens, it should be appreciated that equations similar to Equations 1 to 20 may be derived and employed for a display device including any suitable quantity of display screens, such as three display screens.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines (EGMs); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to below as an "EGM." Additionally, for brevity and clarity, unless specifically stated otherwise, "EGM" as used below represents one EGM or a plurality of EGMs, and "central server, central controller, or remote host" as used below represents one central server, central controller, or remote host or a plurality of central servers, central controllers, or remote hosts.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 8A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 8B:
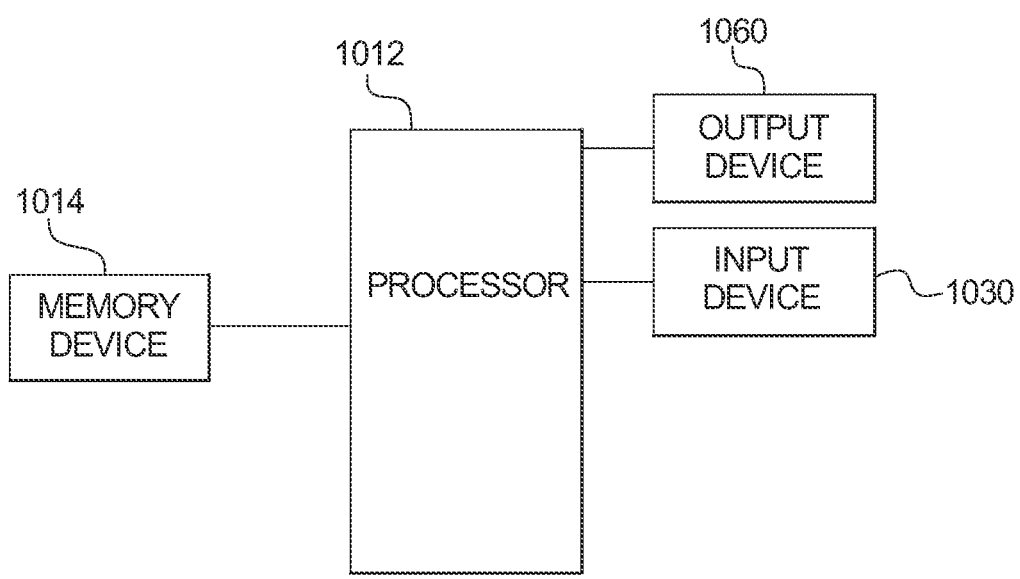
FIG. 8B is a schematic block diagram of an example electronic configuration of an EGM of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 8B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 8B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 9A:
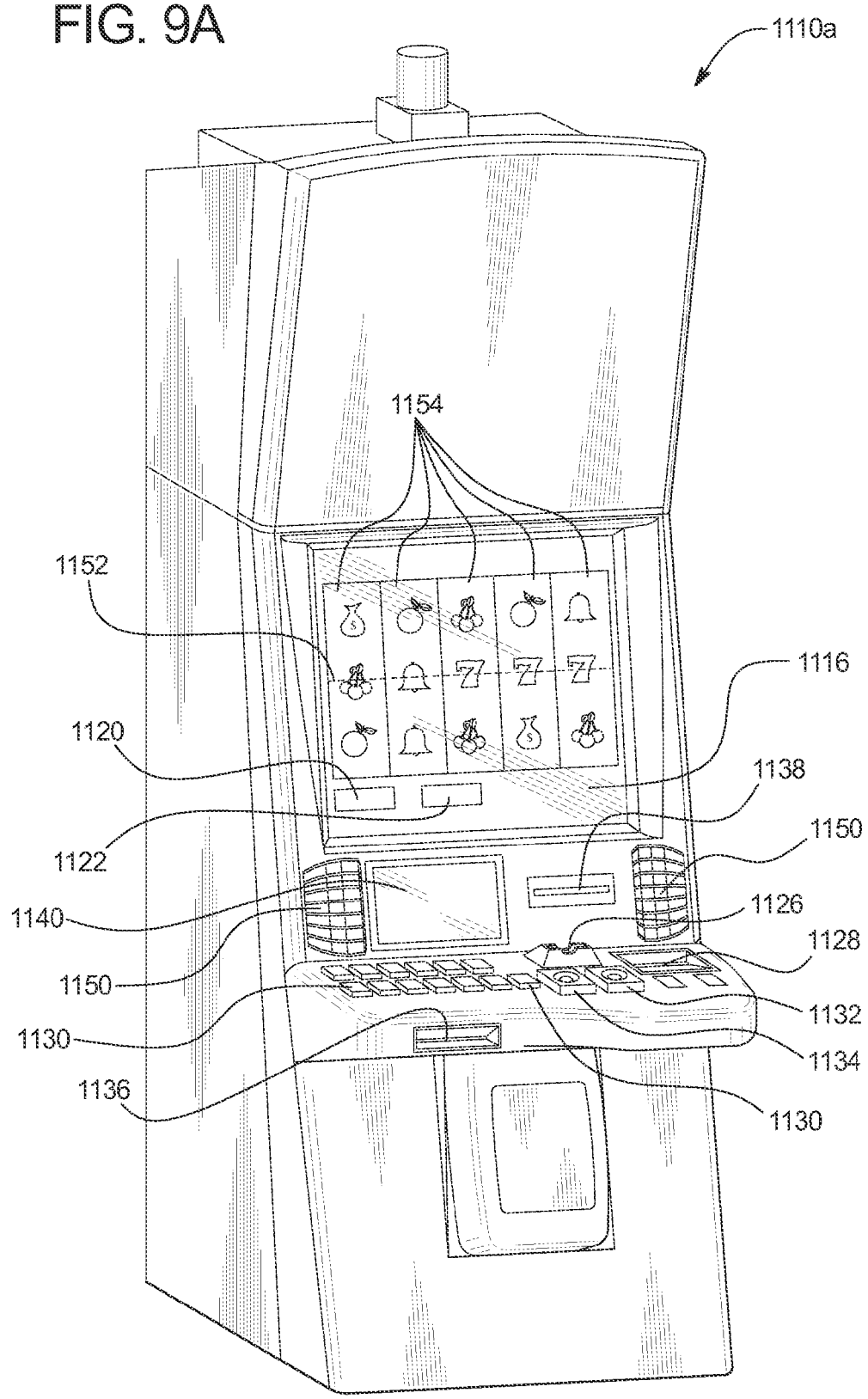
FIGS. 9A and 9B are perspective views of example alternative embodiments of EGMs of the present disclosure.
Figure 9B:
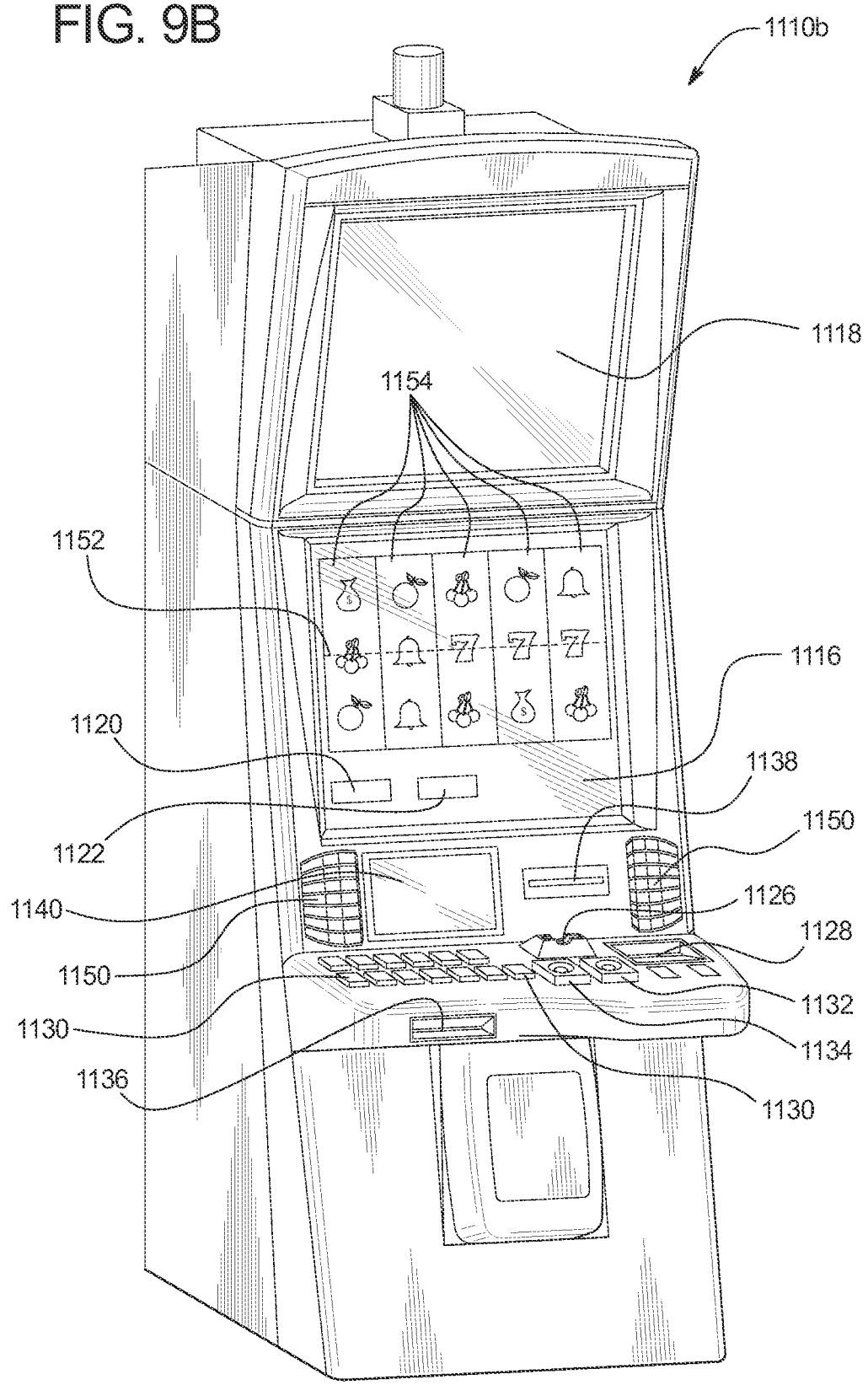

In various embodiments, the EGM includes one or more input devices. The input devices may include any suitable device that enables an input signal to be produced and received by the at least one processor of the EGM. The example EGM illustrated in FIG. 8B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 9A and 9B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 9A and 9B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 9A and 9B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 9A and 9B each include a card reader 1138. The card reader is configured to read a player identification card inserted into the card reader.

In various embodiments, the EGM includes one or more output devices. The example EGM illustrated in FIG. 8B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 9A includes a central display device 1116, a player tracking display 1140, a credit display 1120, and a bet display 1122. The example EGM illustrated in FIG. 9B includes a central display device 1116, an upper display device 1118, a player tracking display 1140, a player tracking display 1140, a credit display 1120, and a bet display 1122. Though it is not apparent by viewing FIGS. 9A and 9B, central display device 1116 includes an exterior display screen and an interior display screen.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 9A and 9B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 9A and 9B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, depth cameras, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 9A and 9B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 9A and 9B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In one embodiment, the gaming system includes a game that enables a player to interact with and make inputs associated with a depth or z-dimension extending into and through a face of the exterior display screen. In another embodiment, the gaming system includes a game in which a player causes different events to occur based on how hard the player pushes on a touch screen. For example, a player could cause reels or objects to move faster by pressing harder on an exterior touch screen. In these types of games, the gaming system can enable the player to interact in the three dimensions by varying the amount of pressure the player applies to the exterior display screen (which operates as a three-dimensional sensing touch screen, as described above).

In another embodiment, the gaming system enables a player to play two or more games on two or more display screens at the same time or at different times. For example, a player can play two related games on two of the display screens simultaneously. In another example, once a player deposits currency, the gaming system enables the player to choose from one or more games to play on different display screens. In another example, the gaming system includes a multi-level bonus scheme that enables a player to advance to different bonus rounds which are displayed and played on different display screens.

As indicated above, in certain embodiments the gaming system also enables players to view information and graphics generated on one display screen playing a game that is displayed on another display screen. Such information and graphics can include game paytables, game-related information, entertaining graphics, background, history or game theme-related information or information not related to the game, such as advertisements. The gaming system displays this information and graphics adjacent to a game, underneath or behind a game or on top of a game. For example, a gaming system displays a reel game on the exterior display screen and also displays paylines on an interior display screen, and the paylines could fade in and fade out periodically.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 9A and 9B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
   a housing;
   at least one processor;
   a display device supported by the housing, the display device including a first display screen and a second display screen, wherein the first display screen and the second display screen are aligned such that at least one line of sight of a player extends through both the first display screen and the second display screen; and
   at least one memory device storing a plurality of instructions which, when executed by the at least one processor, cause the at least one processor to operate with the at least one display device to:
   (a) determine a first location on the first display screen at which to display a portion of a first image, wherein:
      (i) the first location is a first distance from a first reference plane and a second distance from a second reference plane, and
      (ii) the first reference plane and the second reference plane are perpendicular;
   (b) determine a second location on the second display screen at which to display a portion of a second image, wherein:
      (i) the second location is a third distance from the first reference plane and a fourth distance from the second reference plane, and at least one of: (A) the first distance from the first reference plane and the third distance from the first reference plane are different, and (B) the second distance from the second reference plane and the fourth distance from the second reference plane are different; and
      (ii) the at least one processor determines the second location based on a distance separating the player from the first display screen and the determined first location on the first display screen at which to display the portion of the first image; and
   (c) display the portion of the first image at the determined first location on the first display screen and the portion of the second image at the determined second location on the second display screen.

2. The gaming system of claim 1, wherein both: (A) the first distance from the first reference plane and the third distance from the first reference plane are different, and (B) the second distance from the second reference plane and the fourth distance from the second reference plane are different.

3. The gaming system of claim 1, wherein the first reference plane is a horizontal reference plane and the second reference plane is a vertical reference plane.

4. The gaming system of claim 1, wherein the first display screen is an exterior display screen and the second display screen is an interior display screen.

5. The gaming system of claim 4, wherein the at least one processor determines the second location based on a distance separating the exterior display screen from the interior display screen.

6. The gaming system of claim 1, wherein the first display screen is an interior display screen and the second display screen is an exterior display screen.

7. The gaming system of claim 1, wherein the first image and the second image are a same image, and the portion of the first image and the portion of the second image are a same portion of said image.

8. The gaming system of claim 1, wherein the first image and the second image are different images sharing a common image portion, and the portion of the first image and the portion of the second image are said common image portion.

9. The gaming system of claim 1, wherein the plurality of instructions, when executed by the at least one processor, cause the at least one processor to, when the first distance from the first reference plane is equal to zero, determine the second location based on the second distance from the second reference plane.

10. The gaming system of claim 1, wherein the plurality of instructions, when executed by the at least one processor, cause the at least one processor to, when the second distance from the second reference plane is equal to zero, determine the second location based on the first distance from the first reference plane.

11. The gaming system of claim 1, wherein the plurality of instructions, when executed by the at least one processor, cause the at least one processor to, when the second distance from the second reference plane is not equal to zero and the first distance from the first reference plane is not equal to zero, determine the second location based on the second distance from the second reference plane and the first distance from the first reference plane.

12. The gaming system of claim 1, which includes a sensor configured to determine the distance separating the player from the first display screen.

13. The gaming system of claim 1, wherein the first display screen and the second display screen are of a same size and a same shape.

14. The gaming system of claim 1, wherein the first distance from the first reference plane and the second distance from the second reference plane are one of: (a) the same, and (b) different.

15. The gaming system of claim 1, wherein the third distance from the first reference plane and the fourth distance from the second reference plane are one of: (a) the same, and (b) different.

16. A method of operating gaming system, the gaming system including a housing and a display device supported by the housing, the display device including a first display screen and a second display screen, wherein the first display screen and the second display screen are aligned such that at least one line of sight of a player extends through both the first display screen and the second display screen, said method comprising causing at least one processor to execute a plurality of instructions stored in at least one memory device to:
(a) determine a first location on the first display screen at which to display a portion of a first image, wherein:
(i) the first location is a first distance from a first reference plane and a second distance from a second reference plane, and
(ii) the first reference plane and the second reference plane are perpendicular;
(b) determine a second location on the second display screen at which to display a portion of a second image, wherein:
(i) the second location is a third distance from the first reference plane and a fourth distance from the second reference plane, and at least one of: (A) the first distance from the first reference plane and the third distance from the first reference plane are different, and (B) the second distance from the second reference plane and the fourth distance from the second reference plane are different; and
(ii) the at least one processor determines the second location based on a distance separating the player from the first display screen and the determined first location on the first display screen at which to display the portion of the first image; and
(c) operate with the display device to display the portion of the first image at the determined first location on the first display screen and the portion of the second image at the determined second location on the second display screen.

17. The method of claim 16, wherein both: (A) the first distance from the first reference plane and the third distance from the first reference plane are different, and (B) the second distance from the second reference plane and the fourth distance from the second reference plane are different.

18. The method of claim 16, wherein the first reference plane is a horizontal reference plane and the second reference plane is a vertical reference plane.

19. The method of claim 16, wherein the first display screen is an exterior display screen and the second display screen is an interior display screen.

20. The method of claim 19, wherein the at least one processor determines the second location based on a distance separating the exterior display screen from the interior display screen.

21. The method of claim 16, wherein the first display screen is an interior display screen and the second display screen is an exterior display screen.

22. The method of claim 16, wherein the first image and the second image are a same image, and the portion of the first image and the portion of the second image are a same portion of said image.

23. The method of claim 16, wherein the first image and the second image are different images sharing a common image portion, and the portion of the first image and the portion of the second image are said common image portion.

24. The method of claim 16, which includes causing the at least one processor to execute the plurality of instructions to, when the first distance from the first reference plane is equal to zero, determine the second location based on the second distance from the second reference plane.

25. The method of claim 16, which includes causing the at least one processor to execute the plurality of instructions to, when the second distance from the second reference plane is equal to zero, determine the second location based on the first distance from the first reference plane.

26. The method of claim 16, which includes causing the at least one processor to execute the plurality of instructions to, when the second distance from the second reference plane is not equal to zero and the first distance from the first reference plane is not equal to zero, determine the second location based on the second distance from the second reference plane and the first distance from the first reference plane.

27. The method of claim 16, which includes a sensor configured to determine the distance separating the player from the first display screen.

28. The method of claim 16, wherein the first display screen and the second display screen are of a same size and a same shape.

29. The method of claim 16, wherein the first distance from the first reference plane and the second distance from the second reference plane are one of: (a) the same, and (b) different.

30. The method of claim 16, wherein the third distance from the first reference plane and the fourth distance from the second reference plane are one of: (a) the same, and (b) different.

* * * * *